United States Patent
Berkes et al.

(10) Patent No.: US 10,048,763 B2
(45) Date of Patent: Aug. 14, 2018

(54) DISTANCE SCALABLE NO TOUCH COMPUTING

(71) Applicant: Microsoft Technology Licensing, LLC, Redmond, WA (US)

(72) Inventors: Otto G. Berkes, Seattle, WA (US); Steven Bathiche, Kirkland, WA (US); John Clavin, Seattle, WA (US); Ian LeGrow, Redmond, WA (US); Joseph Reginald Scott Molnar, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 292 days.

(21) Appl. No.: 14/462,275

(22) Filed: Aug. 18, 2014

(65) Prior Publication Data

US 2015/0100926 A1 Apr. 9, 2015

Related U.S. Application Data

(63) Continuation of application No. 12/621,989, filed on Nov. 19, 2009, now Pat. No. 8,843,857.

(51) Int. Cl.
*G06F 3/0488* (2013.01)
*G06F 3/01* (2006.01)
(Continued)

(52) U.S. Cl.
CPC .............. *G06F 3/017* (2013.01); *G06F 3/011* (2013.01); *G06F 3/0304* (2013.01);
(Continued)

(58) Field of Classification Search
CPC ........ G06F 3/017; G06F 3/011; G06F 3/0425; G06F 3/0346; G06F 3/0488; G09G 5/00
See application file for complete search history.

(56) References Cited

U.S. PATENT DOCUMENTS 4,627,620 A 12/1986 Yang
4,630,910 A 12/1986 Ross et al.
(Continued)

FOREIGN PATENT DOCUMENTS

CN 101254344 B 6/2010
EP 0583061 A2 2/1994
(Continued)

OTHER PUBLICATIONS

View-based Interpretation of Real-time Optical Flow for Gesture Recognition—Published Date: 1998 http://citeseerx.ist.psu.edu/viewdoc/download?doi=10.1.1.32.8078&rep=rep1-&type=pdf.
(Continued)

*Primary Examiner* — Sang H Kim
(74) *Attorney, Agent, or Firm* — Drinker Biddle & Reath LLP

(57) ABSTRACT

Disclosed herein are techniques for scaling and translating gestures such that the applicable gestures for control may vary depending on the user's distance from a gesture-based system. The techniques for scaling and translation may take the varying distances from which a user interacts with components of the gesture-based system, such as a computing environment or capture device, into consideration with respect to defining and/or recognizing gestures. In an example embodiment, the physical space is divided into virtual zones of interaction, and the system may scale or translate a gesture based on the zones. A set of gesture data may be associated with each virtual zone such that gestures appropriate for controlling aspects of the gesture-based system may vary throughout the physical space.

20 Claims, 11 Drawing Sheets

(51) Int. Cl.
*G06F 3/03* (2006.01)
*G06K 9/00* (2006.01)
*G06K 9/68* (2006.01)

(52) U.S. Cl.
CPC ....... *G06F 3/0488* (2013.01); *G06K 9/00335* (2013.01); *G06K 9/6807* (2013.01)

(56) References Cited

U.S. PATENT DOCUMENTS

| | | |
|---|---|---|
| 4,645,458 A | 2/1987 | Williams |
| 4,695,953 A | 9/1987 | Blair et al. |
| 4,702,475 A | 10/1987 | Elstein et al. |
| 4,711,543 A | 12/1987 | Blair et al. |
| 4,751,642 A | 6/1988 | Silva et al. |
| 4,796,997 A | 1/1989 | Svetkoff et al. |
| 4,809,065 A | 2/1989 | Harris et al. |
| 4,817,950 A | 4/1989 | Goo |
| 4,843,568 A | 6/1989 | Krueger et al. |
| 4,893,183 A | 1/1990 | Nayar |
| 4,901,362 A | 2/1990 | Terzian |
| 4,925,189 A | 5/1990 | Braeunig |
| 5,101,444 A | 3/1992 | Wilson et al. |
| 5,148,154 A | 9/1992 | MacKay et al. |
| 5,184,295 A | 2/1993 | Mann |
| 5,229,754 A | 7/1993 | Aoki et al. |
| 5,229,756 A | 7/1993 | Kosugi et al. |
| 5,239,463 A | 8/1993 | Blair et al. |
| 5,239,464 A | 8/1993 | Blair et al. |
| 5,288,078 A | 2/1994 | Capper et al. |
| 5,295,491 A | 3/1994 | Gevins |
| 5,320,538 A | 6/1994 | Baum |
| 5,347,306 A | 9/1994 | Nitta |
| 5,385,519 A | 1/1995 | Hsu et al. |
| 5,405,152 A | 4/1995 | Katanics et al. |
| 5,417,210 A | 5/1995 | Funda et al. |
| 5,423,554 A | 6/1995 | Davis |
| 5,454,043 A | 9/1995 | Freeman |
| 5,469,740 A | 11/1995 | French et al. |
| 5,495,576 A | 2/1996 | Ritchey |
| 5,516,105 A | 5/1996 | Eisenbrey et al. |
| 5,524,637 A | 6/1996 | Erickson et al. |
| 5,534,917 A | 7/1996 | MacDougall |
| 5,563,988 A | 10/1996 | Maes et al. |
| 5,577,981 A | 11/1996 | Jarvik |
| 5,580,249 A | 12/1996 | Jacobsen et al. |
| 5,594,469 A | 1/1997 | Freeman et al. |
| 5,597,309 A | 1/1997 | Riess |
| 5,616,078 A | 4/1997 | Oh |
| 5,617,312 A | 4/1997 | Iura et al. |
| 5,638,300 A | 6/1997 | Johnson |
| 5,641,288 A | 6/1997 | Zaenglein |
| 5,682,196 A | 10/1997 | Freeman |
| 5,682,229 A | 10/1997 | Wangler |
| 5,690,582 A | 11/1997 | Ulrich et al. |
| 5,703,367 A | 12/1997 | Hashimoto et al. |
| 5,704,837 A | 1/1998 | Iwasaki et al. |
| 5,715,834 A | 2/1998 | Bergamasco et al. |
| 5,875,108 A | 2/1999 | Hoffberg et al. |
| 5,877,803 A | 3/1999 | Wee et al. |
| 5,913,727 A | 6/1999 | Ahdoot |
| 5,933,125 A | 8/1999 | Fernie |
| 5,980,256 A | 11/1999 | Carmein |
| 5,989,157 A | 11/1999 | Walton |
| 5,995,649 A | 11/1999 | Marugame |
| 6,005,548 A | 12/1999 | Latypov et al. |
| 6,009,210 A | 12/1999 | Kang |
| 6,054,991 A | 4/2000 | Crane et al. |
| 6,066,075 A | 5/2000 | Poulton |
| 6,072,494 A | 6/2000 | Nguyen |
| 6,073,489 A | 6/2000 | French et al. |
| 6,077,201 A | 6/2000 | Cheng et al. |
| 6,098,458 A | 8/2000 | French et al. |
| 6,100,896 A | 8/2000 | Strohecker et al. |
| 6,101,289 A | 8/2000 | Kellner |
| 6,128,003 A | 10/2000 | Smith et al. |
| 6,130,677 A | 10/2000 | Kunz |
| 6,141,463 A | 10/2000 | Covell et al. |
| 6,147,678 A | 11/2000 | Kumar et al. |
| 6,152,856 A | 11/2000 | Studor et al. |
| 6,159,100 A | 12/2000 | Smith |
| 6,173,066 B1 | 1/2001 | Peurach et al. |
| 6,181,343 B1 | 1/2001 | Lyons |
| 6,188,777 B1 | 2/2001 | Darrell et al. |
| 6,195,104 B1 | 2/2001 | Lyons |
| 6,215,890 B1 | 4/2001 | Matsuo et al. |
| 6,215,898 B1 | 4/2001 | Woodfill et al. |
| 6,222,465 B1 | 4/2001 | Kumar |
| 6,226,396 B1 | 5/2001 | Marugame |
| 6,229,913 B1 | 5/2001 | Nayar et al. |
| 6,256,033 B1 | 7/2001 | Nguyen |
| 6,256,400 B1 | 7/2001 | Takata et al. |
| 6,283,860 B1 | 9/2001 | Lyons et al. |
| 6,289,112 B1 | 9/2001 | Jain et al. |
| 6,299,308 B1 | 10/2001 | Voronka et al. |
| 6,308,565 B1 | 10/2001 | French et al. |
| 6,316,934 B1 | 11/2001 | Amorai-Moriya et al. |
| 6,363,160 B1 | 3/2002 | Bradski et al. |
| 6,384,819 B1 | 5/2002 | Hunter |
| 6,411,744 B1 | 6/2002 | Edwards |
| 6,430,997 B1 | 8/2002 | French et al. |
| 6,476,834 B1 | 11/2002 | Doval et al. |
| 6,496,598 B1 | 12/2002 | Harman |
| 6,503,195 B1 | 1/2003 | Keller et al. |
| 6,539,931 B2 | 4/2003 | Trajkovic et al. |
| 6,570,555 B1 | 5/2003 | Prevost et al. |
| 6,633,294 B1 | 10/2003 | Rosenthal et al. |
| 6,640,202 B1 | 10/2003 | Dietz et al. |
| 6,661,918 B1 | 12/2003 | Gordon et al. |
| 6,681,031 B2 | 1/2004 | Cohen et al. |
| 6,714,665 B1 | 3/2004 | Hanna et al. |
| 6,731,799 B1 | 5/2004 | Sun et al. |
| 6,738,066 B1 | 5/2004 | Nguyen |
| 6,765,726 B2 | 7/2004 | French et al. |
| 6,788,809 B1 | 9/2004 | Grzeszczuk et al. |
| 6,801,637 B2 | 10/2004 | Voronka et al. |
| 6,873,723 B1 | 3/2005 | Aucsmith et al. |
| 6,876,496 B2 | 4/2005 | French et al. |
| 6,937,742 B2 | 8/2005 | Roberts et al. |
| 6,950,534 B2 | 9/2005 | Cohen et al. |
| 7,003,134 B1 | 2/2006 | Covell et al. |
| 7,030,861 B1 | 4/2006 | Westerman et al. |
| 7,036,094 B1 | 4/2006 | Cohen et al. |
| 7,038,855 B2 | 5/2006 | French et al. |
| 7,039,676 B1 | 5/2006 | Day et al. |
| 7,042,440 B2 | 5/2006 | Pryor et al. |
| 7,050,606 B2 | 5/2006 | Paul et al. |
| 7,058,204 B2 | 6/2006 | Hildreth et al. |
| 7,060,957 B2 | 6/2006 | Lange et al. |
| 7,113,918 B1 | 9/2006 | Ahmed et al. |
| 7,121,946 B2 | 10/2006 | Paul et al. |
| 7,170,492 B2 | 1/2007 | Bell |
| 7,184,048 B2 | 2/2007 | Hunter |
| 7,202,898 B1 | 4/2007 | Braun et al. |
| 7,222,078 B2 | 5/2007 | Abelow |
| 7,227,526 B2 | 6/2007 | Hildreth et al. |
| 7,259,747 B2 | 8/2007 | Bell |
| 7,308,112 B2 | 12/2007 | Fujimura et al. |
| 7,317,836 B2 | 1/2008 | Fujimura et al. |
| 7,340,077 B2 | 3/2008 | Gokturk et al. |
| 7,348,963 B2 | 3/2008 | Bell |
| 7,359,121 B2 | 4/2008 | French et al. |
| 7,367,887 B2 | 5/2008 | Watabe et al. |
| 7,379,563 B2 | 5/2008 | Shamaie |
| 7,379,566 B2 | 5/2008 | Hildreth |
| 7,389,591 B2 | 6/2008 | Jaiswal et al. |
| 7,412,077 B2 | 8/2008 | Li et al. |
| 7,421,093 B2 | 9/2008 | Hildreth et al. |
| 7,430,312 B2 | 9/2008 | Gu |
| 7,436,496 B2 | 10/2008 | Kawahito |
| 7,450,736 B2 | 11/2008 | Yang et al. |
| 7,452,275 B2 | 11/2008 | Kuraishi |
| 7,460,690 B2 | 12/2008 | Cohen et al. |
| 7,489,812 B2 | 2/2009 | Fox et al. |
| 7,536,032 B2 | 5/2009 | Bell |

(56) References Cited

U.S. PATENT DOCUMENTS

| | | | |
|---|---|---|---|
| 7,555,142 | B2 | 6/2009 | Hildreth et al. |
| 7,560,701 | B2 | 7/2009 | Oggier et al. |
| 7,570,805 | B2 | 8/2009 | Gu |
| 7,574,020 | B2 | 8/2009 | Shamaie |
| 7,576,727 | B2 | 8/2009 | Bell |
| 7,590,262 | B2 | 9/2009 | Fujimura et al. |
| 7,593,552 | B2 | 9/2009 | Higaki et al. |
| 7,598,942 | B2 | 10/2009 | Underkoffler et al. |
| 7,607,509 | B2 | 10/2009 | Schmiz et al. |
| 7,620,202 | B2 | 11/2009 | Fujimura et al. |
| 7,668,340 | B2 | 2/2010 | Cohen et al. |
| 7,680,298 | B2 | 3/2010 | Roberts et al. |
| 7,683,954 | B2 | 3/2010 | Ichikawa et al. |
| 7,684,592 | B2 | 3/2010 | Paul et al. |
| 7,701,439 | B2 | 4/2010 | Hillis et al. |
| 7,702,130 | B2 | 4/2010 | Im et al. |
| 7,704,135 | B2 | 4/2010 | Harrison, Jr. |
| 7,710,391 | B2 | 5/2010 | Bell et al. |
| 7,729,530 | B2 | 6/2010 | Antonov et al. |
| 7,746,345 | B2 | 6/2010 | Hunter |
| 7,760,182 | B2 | 7/2010 | Ahmad et al. |
| 7,809,167 | B2 | 10/2010 | Bell |
| 7,834,846 | B1 | 11/2010 | Bell |
| 7,852,262 | B2 | 12/2010 | Namineni et al. |
| RE42,256 | E | 3/2011 | Edwards |
| 7,898,522 | B2 | 3/2011 | Hildreth et al. |
| 8,035,612 | B2 | 10/2011 | Bell et al. |
| 8,035,614 | B2 | 10/2011 | Bell et al. |
| 8,035,624 | B2 | 10/2011 | Bell et al. |
| 8,072,470 | B2 | 12/2011 | Marks |
| 8,073,198 | B2 | 12/2011 | Marti |
| 8,230,367 | B2* | 7/2012 | Bell .................. G06F 3/011 382/154 |
| 2002/0006222 | A1 | 1/2002 | Inagaki et al. |
| 2002/0041327 | A1 | 4/2002 | Hildreth et al. |
| 2004/0136564 | A1* | 7/2004 | Roeber .............. G06F 3/0488 382/100 |
| 2005/0030291 | A1* | 2/2005 | Yanagisawa ........ G06F 3/0418 345/173 |
| 2005/0088409 | A1* | 4/2005 | Van Berkel ......... G06F 3/017 345/157 |
| 2006/0182346 | A1 | 8/2006 | Yoda et al. |
| 2008/0026838 | A1 | 1/2008 | Dunstan et al. |
| 2008/0129686 | A1 | 6/2008 | Han |
| 2008/0165160 | A1 | 7/2008 | Kocienda et al. |
| 2008/0263479 | A1 | 10/2008 | Bloem et al. |
| 2009/0102800 | A1 | 4/2009 | Keenan |
| 2009/0143141 | A1 | 6/2009 | Wells et al. |
| 2009/0172606 | A1 | 7/2009 | Dunn et al. |
| 2009/0217211 | A1 | 8/2009 | Hildreth et al. |
| 2009/0282370 | A1* | 11/2009 | Rainwater .......... G06F 3/04883 715/863 |
| 2010/0103106 | A1* | 4/2010 | Chui .................. G06F 3/017 345/166 |
| 2010/0269072 | A1 | 10/2010 | Sakata et al. |

FOREIGN PATENT DOCUMENTS

| | | |
|---|---|---|
| JP | 08044490 A | 2/1996 |
| WO | WO 1993/10708 A1 | 6/1993 |
| WO | WO 1997/17598 A1 | 5/1997 |
| WO | WO 1999/44698 | 9/1999 |

OTHER PUBLICATIONS

Vision-Based Gesture Recognition: A Review—Published Date: 1999 http://citeseerx.ist.psu.edu/viewdoc/download?doi=10.1.1.42. 346&rep=rep1&-type=pdf.

Computer Vision Based Human-Computer Interaction—Published Date: Jun. 2, 2002 http://www.nada.kth.se/cvap/gvmdi/.

"Virtual High Anxiety", Tech Update, Aug. 1995, pp. 22.

Aggarwal et al., "Human Motion Analysis: A Review", IEEE Nonrigid and Articulated Motion Workshop, 1997, University of Texas at Austin, Austin, TX.

Azarbayejani et al., "Visually Controlled Graphics", Jun. 1993, vol. 15, No. 6, IEEE Transactions on Pattern Analysis and Machine Intelligence.

Breen et al., "Interactive Occlusion and Collusion of Real and Virtual Objects in Augmented Reality", Technical Report ECRC-95-02, 1995, European Computer-Industry Research Center GmbH, Munich, Germany.

Brogan et al., "Dynamically Simulated Characters in Virtual Environments", Sep./Oct. 1998, pp. 2-13, vol. 18, Issue 5, IEEE Computer Graphics and Applications.

Fisher et al., "Virtual Environment Display System", ACM Workshop on Interactive 3D Graphics, Oct. 1986, Chapel Hill, NC.

Freeman et al., "Television Control by Hand Gestures", Dec. 1994, Mitsubishi Electric Research Laboratories, TR94-24, Caimbridge, MA.

Granieri et al., "Simulating Humans in VR", The British Computer Society, Oct. 1994, Academic Press.

Hasegawa et al., "Human-Scale Haptic Interaction with a Reactive Virtual Human in a Real-Time Physics Simulator", Jul. 2006, vol. 4, No. 3, Article 6C, ACM Computers in Entertainment, New York, NY.

He, "Generation of Human Body Models", Apr. 2005, University of Auckland, New Zealand.

Hongo et al., "Focus of Attention for Face and Hand Gesture Recognition Using Multiple Cameras", Mar. 2000, pp. 156-161, 4th IEEE International Conference on Automatic Face and Gesture Recognition, Grenoble, France.

Isard et al., "Condensation-Conditional Density Propagation for Visual Tracking", 1998, pp. 5-28, International Journal of Computer Vision 29(1), Netherlands.

Kanade et al., "A Stereo Machine for Video-rate Dense Depth Mapping and Its New Applications", IEEE Computer Society Conference on Computer Vision and Pattern Recognition, 1996, pp. 196-202,The Robotics Institute, Carnegie Mellon University, Pittsburgh, PA.

Kohler, "Special Topics of Gesture Recognition Applied in Intelligent Home Environments", In Proceedings of the Gesture Workshop, 1998, pp. 285-296, Germany.

Kohler, "Technical Details and Ergonomical Aspects of Gesture Recognition applied in Intelligent Home Environments", 1997, Germany.

Kohler, "Vision Based Remote Control in Intelligent Home Environments", University of Erlangen-Nuremberg/Germany, 1996, pp. 147-154, Germany.

Livingston, "Vision-based Tracking with Dynamic Structured Light for Video See-through Augmented Reality", 1998, University of North Carolina at Chapel Hill, North Carolina, USA.

Miyagawa et al., "CCD-Based Range Finding Sensor", Oct. 1997, pp. 1648-1652, vol. 44 No. 10, IEEE Transactions on Electron Devices.

Pavlovic et al., "Visual Interpretation of Hand Gestures for Human-Computer Interaction: A Review", Jul. 1997, pp. 677-695, vol. 19, No. 7, IEEE Transactions on Pattern Analysis and Machine Intelligence.

Qian et al., "A Gesture-Driven Multimodal Interactive Dance System", Jun. 2004, pp. 1579-1582, IEEE International Conference on Multimedia and Expo (ICME), Taipei, Taiwan.

Rosenhahn et al., "Automatic Human Model Generation", 2005, pp. 41-48, University of Auckland (CITR), New Zealand.

Shao et al., "An Open System Architecture for a Multimedia and Multimodal User Interface", Aug. 24, 1998, Japanese Society for Rehabilitation of Persons with Disabilities (JSRPD), Japan.

Sheridan et al., "Virtual Reality Check", Technology Review, Oct. 1993, pp. 22-28, vol. 96, No. 7.

Stevens, "Flights into Virtual Reality Treating Real World Disorders", The Washington Post, Mar. 27, 1995, Science Psychology, 2 pages.

Wren et al., "Pfinder: Real-Time Tracking of the Human Body", MIT Media Laboratory Perceptual Computing Section Technical

(56) References Cited

OTHER PUBLICATIONS

Report No. 353, Jul. 1997, vol. 19, No. 7, pp. 780-785, IEEE Transactions on Pattern Analysis and Machine Intelligence, Caimbridge, MA.

Zhao, "Dressed Human Modeling, Detection, and Parts Localization", 2001, The Robotics Institute, Carnegie Mellon University, Pittsburgh, PA.

* cited by examiner

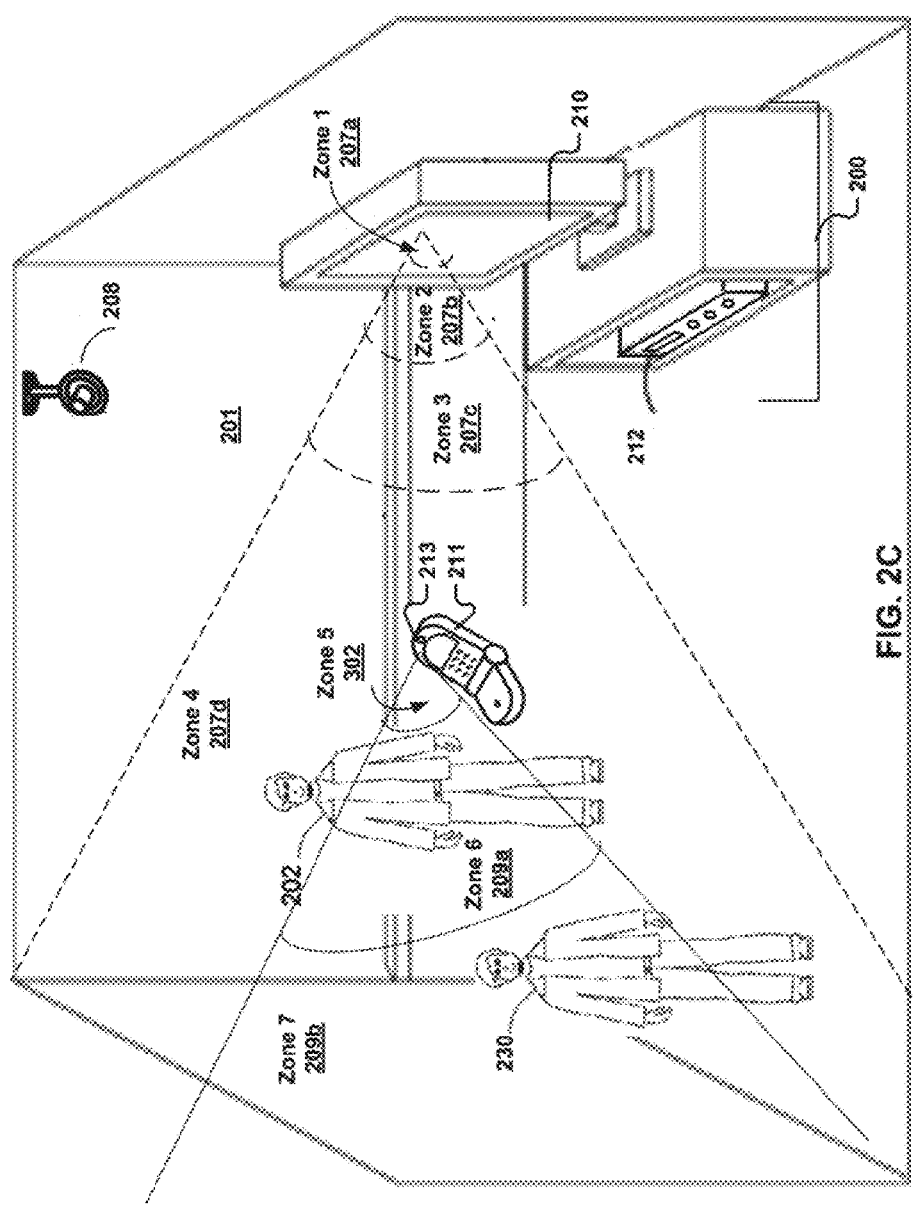

DISTANCE SCALABLE NO TOUCH COMPUTING

CROSS-REFERENCE TO RELATED APPLICATIONS

This application is a continuation of prior application Ser. No. 12/621,989, filed Nov. 19, 2009, the contents of which are herein incorporated by reference in their entirety.

BACKGROUND

Many computing applications such as computer games, multimedia applications, office applications or the like use controls to allow users to manipulate characters or control other aspects of an application. Typically such controls are input using, for example, controllers, remotes, keyboards, mice, or the like. Unfortunately, such controls can be difficult to learn, thus creating a barrier between a user and such applications. Furthermore, such controls may be different than actual actions for which the controls are used. For example, a game control that causes a game character to swing a baseball bat may be a combination of buttons and may not correspond to an actual motion of swinging the baseball bat, or a control to reposition a view on a screen, such as repositioning the view of a map in a map application, may be a selection of arrow buttons on a keyboard and may not correspond to the actual motion of the files.

SUMMARY

In a gesture-based system, gestures may control aspects of a computing environment or application, where the gestures may be derived from a user's position or movement in a physical space. To create a satisfactory user experience, it may be desirable that the gestures correspond to natural user positions or motions with respect to the distance that the user interacts with the device. For example, a user may interact with a cell phone or other mobile device at a very close distance, but may interact with a television screen at a larger distance. Disclosed herein are techniques for scaling and translating gestures such that the applicable gestures for control may vary depending on the user's distance from the computing environment. The techniques for scaling and translation may take the varying distances from which a user interacts with components of the gesture-based system, such as a computing environment or capture device, into consideration with respect to defining and/or recognizing gestures. In an example embodiment, the physical space is divided into virtual zones of interaction, and the system may scale or translate a gesture based on the zones.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

BRIEF DESCRIPTION OF THE DRAWINGS

The foregoing Summary, as well as the following Detailed Description of illustrative embodiments, is better understood when read in conjunction with the appended drawings. For the purpose of illustrating the embodiments, there are shown in the drawings example constructions of the embodiments; however, the embodiments are not limited to the specific methods and instrumentalities disclosed. In the drawings:

FIGS. 2A, 2B, and 2C illustrate example embodiments of a physical space and various components of a gesture-based system that may implement gesture identification techniques based on virtual zones.

DETAILED DESCRIPTION OF ILLUSTRATIVE EMBODIMENTS

Figure 1:
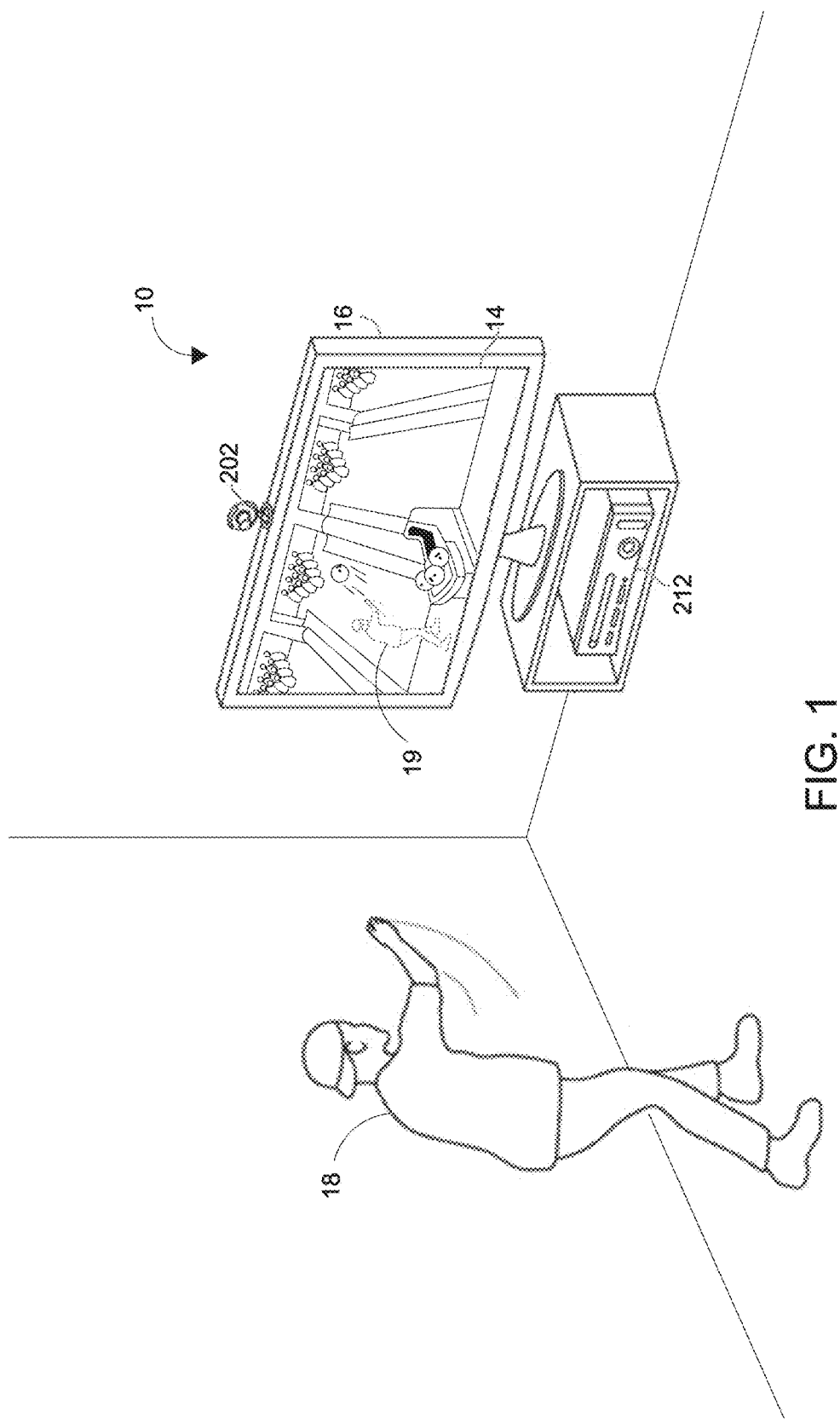
FIG. 1 illustrates an example embodiment of a target recognition, analysis, and tracking system with a user playing a game.

Disclosed herein are techniques for gesture scaling and translation. The subject matter of the disclosed embodiments is described with specificity to meet statutory requirements. However, the description itself is not intended to limit the scope of this patent. Rather, the claimed subject matter might also be embodied in other ways, to include elements similar to the ones described in this document in conjunction with other present or future technologies.

Embodiments are related to techniques for gesture scaling and translation. A gesture may be derived from a user's position or motion in the physical space and may include any user motion, dynamic or static, such as running, moving a finger, or a static pose. According to an example embodiment, a capture device, such as a camera, may capture data, such as image data, that is representative of the user's gesture(s). A computer environment may be used to recognize and analyze the gestures made by the user in the user's three-dimensional physical space such that the user's gestures may be interpreted to control aspects of a system or application space. The computer environment may display user feedback by mapping the user's gesture(s) to an avatar on a screen.

A gesture-based system or application may have default gesture information for determining if a user is performing a particular gesture. For example, a system may have a gesture recognizer that compares captured data to a database of default gesture information such as filters with default gesture parameters. The gesture recognizer may compare data received by the capture device to the default gesture information and output a gesture. The output may include a confidence level that the output gesture was performed.

A gesture-based system may employ techniques for scaling and translating gestures to accommodate the different distances from which a user interacts with the system. Thus, based on the distance of the user from the computing environment or capture device, for example, different scales of gesture inputs may be input for a given desired outcome of the gesture input. In an example embodiment, the physical space is divided into zones, and a set of gestures may be applicable for each zone. Each zone may represent a region of the physical space that is defined according to a distance(s) from a capture device. Gestures within the set of gestures may be unique to the zone or may be common across several zones. Also, the system may perform efficient gesture recognition such that, near the boundaries of a zone, the system can evaluate the user's gestures within the context of multiple zones.

The system, methods, techniques, and components of scaling and translating gestures may be embodied in a multi-media console, such as a gaming console, or in any other computing environment in which it is desired to display a visual representation of a target, including, by way of example and without any intended limitation, satellite receivers, set top boxes, arcade games, personal computers (PCs), portable telephones, personal digital assistants (PDAs), and other hand-held devices.

FIG. 1 illustrates an example embodiment of a configuration of a target recognition, analysis, and tracking gesture-based system 10 that may employ the disclosed techniques for gesture personalization and gesture profile roaming. In the example embodiment, a user 18 is playing a bowling game. In an example embodiment, the system 10 may recognize, analyze, and/or track a human target such as the user 18. The system 10 may gather information related to the user's motions, facial expressions, body language, emotions, etc, in the physical space. For example, the system may identify and scan the human target 18. The system 10 may use body posture recognition techniques to identify the body type of the human target 18. The system 10 may identify the body parts of the user 18 and how they move.

As shown in FIG. 1, the target recognition, analysis, and tracking system 10 may include a computing environment 212. The computing environment 212 may be a multimedia console, a personal computer (PC), a cellular device, a gaming system or console, a handheld computing device, a PDA, a music player, a cloud computer, a capture device, or the like. According to an example embodiment, the computing environment 212 may include hardware components and/or software components such that the computing environment 212 may be used to execute applications. An application may be any program that operates or is executed by the computing environment including both gaming and non-gaming applications, such as a word processor, spreadsheet, media player, database application, computer game, video game, chat, forum, community, instant messaging, or the like.

As shown in FIG. 1, the target recognition, analysis, and tracking system 10 may include a capture device 202. The capture device 202 may be, for example, a camera that may be used to visually monitor one or more users, such as the user 18, such that gestures performed by the one or more users may be captured, analyzed, and tracked to perform one or more controls or actions within an application. In the example embodiment shown in FIG. 1, a virtual object is a bowling ball and the user moves in the three-dimensional physical space as if actually handling the bowling ball. The user's gestures in the physical space can control the bowling ball displayed on the screen 14. In example embodiments, the human target such as the user 18 may actually have a physical object. In such embodiments, the user of an electronic game may be holding the object such that the motions of the player and the object may be used to adjust and/or control parameters of the game. For example, the motion of a player holding a racket may be tracked and utilized for controlling an on-screen racket in an electronic sports game. In another example embodiment, the motion of a player holding an object may be tracked and utilized for controlling an on-screen weapon in an electronic combat game.

According to one embodiment, the target recognition, analysis, and tracking system 10 may be connected to an audiovisual device 16 such as a television, a monitor, a high-definition television (HDTV), or the like that may provide game or application visuals and/or audio to a user such as the user 18. For example, the computing environment 212 may include a video adapter such as a graphics card and/or an audio adapter such as a sound card that may provide audiovisual signals associated with the game application, non-game application, or the like. The audiovisual device 16 may receive the audiovisual signals from the computing environment 212 and may then output the game or application visuals and/or audio associated with the audiovisual signals to the user 18. According to one embodiment, the audiovisual device 16 may be connected to the computing environment 212 via, for example, an S-Video cable, a coaxial cable, an HDMI cable, a DVI cable, a VGA cable, or the like.

As used herein, a computing environment may refer to a single computing device or to a computing system. The computing environment may include non-computing components. As used herein, a computing system, computing device, computing environment, computer, processor, or other computing component may be used interchangeably. For example, the computing environment may comprise the entire target recognition, analysis, and tracking system 10 shown in FIG. 1. The computing environment may include the audiovisual device 16 and/or the capture device 202. Either or both of the exemplary audiovisual device 16 or capture device 202 may be an entity separate but coupled to the computing environment or may be part of the computing device that processes and displays, for example. Thus, computing environment may be a standalone capture device comprising a processor that can process the captured data.

As shown in FIG. 1, the target recognition, analysis, and tracking system 10 may be used to recognize, analyze, and/or track a human target such as the user 18. For example, the user 18 may be tracked using the capture device 202 such that the gestures of user 18 may be interpreted as controls that may be used to affect the application being executed by computer environment 212. Thus, according to one embodiment, the user 18 may move his or her body to control the application. The system 10 may track the user's body and the motions made by the user's body, including gestures that control aspects of the system, such as the application, operating system, or the like.

The system 10 may translate an input to a capture device 202 into an animation, the input being representative of a user's motion, such that the animation is driven by that input. Thus, the user's motions may map to a visual representation, such as an avatar, such that the user's motions in the physical space are emulated by the avatar. The rate that frames of image data are captured and displayed may determine the level of continuity of the displayed motion of the visual representation.

FIG. 1 depicts an example embodiment of an application executing on the computing environment 212 that may be a bowling game that the user 18 may be playing. In this example, the computing environment 212 may use the audiovisual device 16 to provide a visual representation of a bowling alley and bowling lanes to the user 18. The computing environment 212 may also use the audiovisual device 16 to provide a visual representation of a player avatar 19 that the user 18 may control with his or her movements. The computer environment 212 and the capture device 202 of the target recognition, analysis, and tracking system 10 may be used to recognize and analyze the gestures made by the user 18 in the user's three-dimensional physical space such that the user's gestures may be interpreted to control the player avatar 19 in game space. For example, as shown in FIG. 1, the user 18 may make a bowling motion in a physical space to cause the player avatar 19 to make a bowling motion in the game space. Other movements by the user 18 may also be interpreted as controls or actions, such as controls to walk, select a ball, position the avatar on the bowling lane, swing the ball, etc.

Multiple users can interact with each other from remote locations. The computing environment 212 may use the audiovisual device 16 to provide the visual representation of an avatar that another user may control with his or her movements. For example, the visual representation of another bowler displayed on the audiovisual device 16 may be representative of another user, such as a second user in the physical space with the user, or a networked user in a second physical space. Similarly, an avatar may be displayed in non-gaming applications, such as a word processing or spreadsheet document. Avatars may be displayed that represent respective users that are remote to each other.

Gestures may be used in a video-game-specific context such as the bowling game example shown in FIG. 1. In another game example such as a driving game, various motions of the hands and feet may correspond to steering a vehicle in a direction, shifting gears, accelerating, and breaking. The player's gestures may be interpreted as controls that correspond to actions other than controlling the avatar 19, such as gestures used for input in a general computing context. For instance, various motions of the user's 18 hands or other body parts may to end, pause, or save a game, select a level, view high scores, communicate with a friend, etc.

While FIG. 1 depicts the user in a video-game-specific context, it is contemplated that the target recognition, analysis, and tracking system 10 may interpret target movements for controlling aspects of an operating system and/or application that are outside the realm of games. Virtually any controllable aspect of an operating system and/or application may be controlled by movements of the target such as the user 18. For example, the user's gestures may correspond to common system wide tasks such as navigate up or down in a hierarchical list, open a file, close a file, and save a file. The user's gesture may be controls applicable to an operating system, non-gaming aspects of a game, or a non-gaming application. For example, the user's gestures may be interpreted as object manipulation, such as controlling a user interface. For example, consider a user interface having blades or a tabbed interface lined up vertically left to right, where the selection of each blade or tab opens up the options for various controls within the application or the system. The system may identify the user's hand gesture for movement of a tab, where the user's hand in the physical space is virtually aligned with a tab in the application space. The gesture, including a pause, a grabbing motion, and then a sweep of the hand to the left, may be interpreted as the selection of a tab, and then moving it out of the way to open the next tab.

Figure 2A:
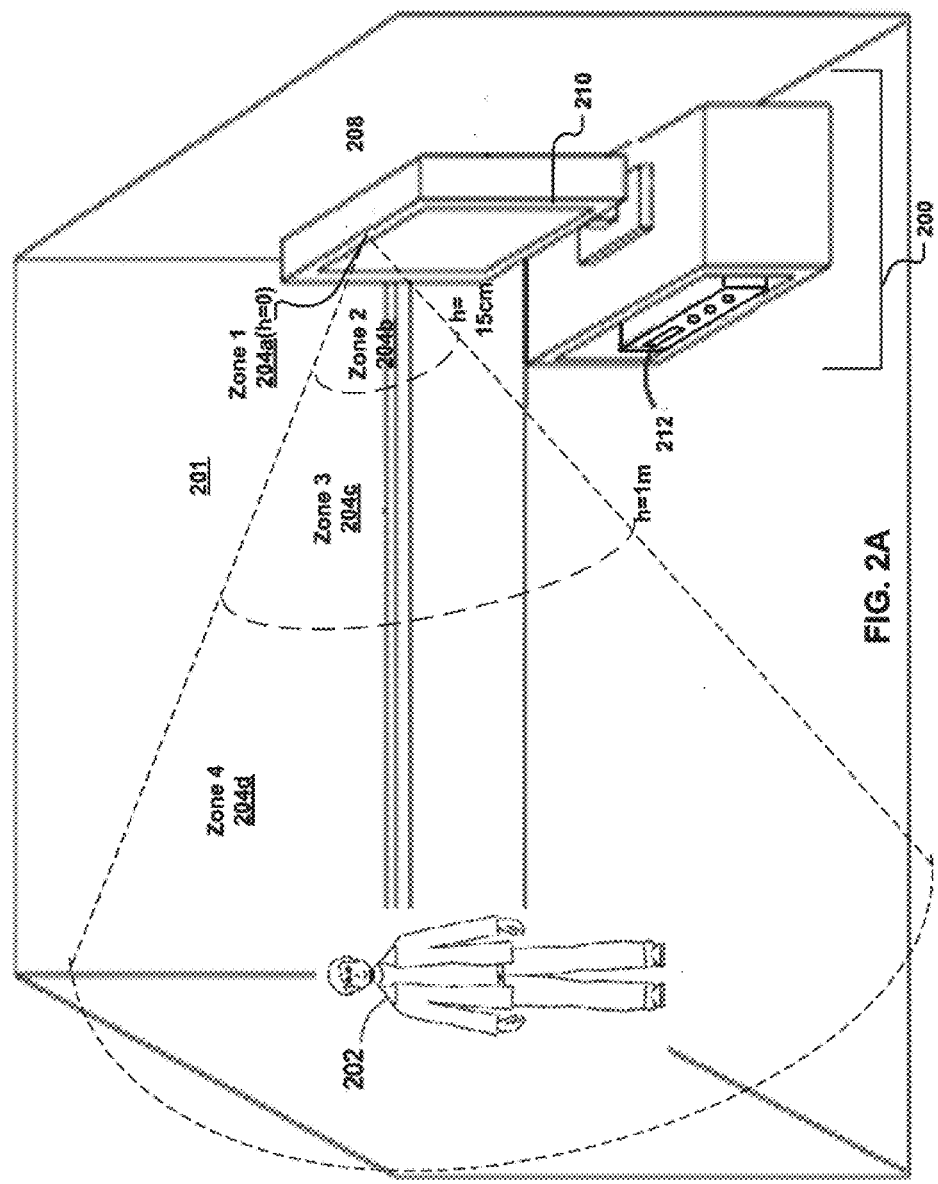
Figure 2B:
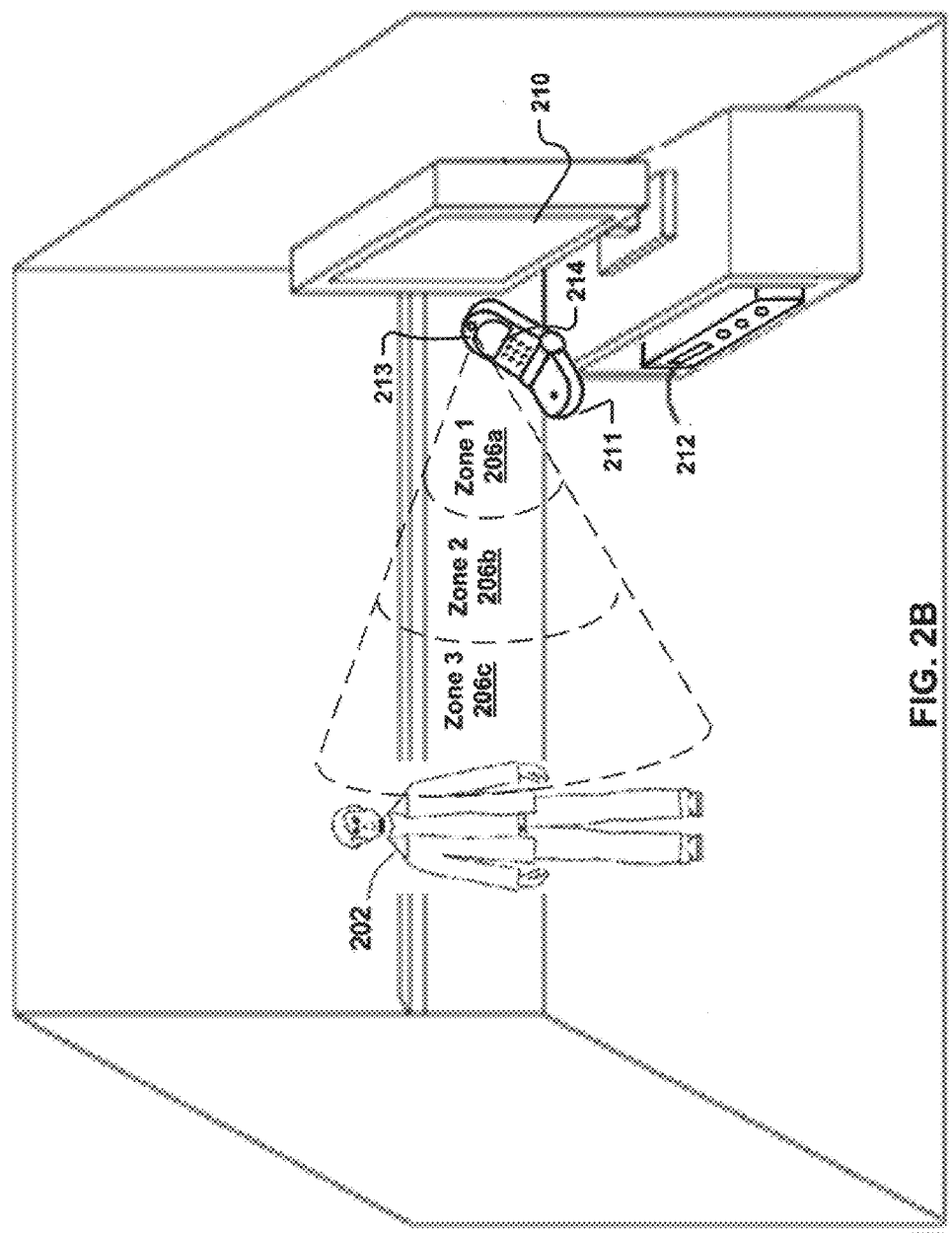

FIGS. 2A-2C each illustrate an example of a system 200 that can capture a user in a physical space 201 and map captured data to a visual representation in a virtual environment. The system 200 may comprise a computing environment, capture device, display, or any combination thereof. A computing environment may be a multimedia console, a personal computer (PC), a gaming system or console, a handheld computing device, a PDA, a mobile phone, a cloud computer, or the like, and may include or otherwise connect to a capture device or display. The capture device, computing device, and display device may comprise any suitable device that performs the desired functionality, such as the devices described with respect to FIG. 1 above or FIGS. 3-8 described below.

The system 200 shown in FIG. 2A comprises an example capture device 208, a computing 210, and a display device 212. The user may interact with the system 200 at varying distances. The system 200 may employ techniques for scaling and translating gestures to accommodate the different distances from which a user interacts with the system 200. Thus, based on the distance of the user from the computing environment or capture device, for example, different scales of gesture inputs may be input for a given desired outcome of the gesture input.

As will be described in more detail below, the physical space may be divided into virtual zones defined at varying distances from the capture device 208. It is contemplated that the physical space may comprise a single zone or be divided into any number of zones. It is noted that, as used herein, a zone comprises any region, area, or section in the physical space that is characterized by a particular feature or quality. For example, the zone may be defined as a two-dimensional region, a three-dimensional region, a spherical or cubical region, a split down the middle of a physical space, or the like. The zones may be a combination of types of zones such that the physical space may be divided into zones of different shapes and sizes.

This system may continuously monitor the depth/position of the user (h) and alter the scale of gesture required for a given result based on variation of (h). As the user moves between zones, the system may receive captured data representative of the user's gestures. The system may identify the user's depth/position (h) and the applicable gestures that correspond to the identified position, for example, based on the virtual zones. In real time, the system may output a command associated with the gesture. Thus, the system is capable of adapting gesture recognition to correspond to the user's distance from the system.

As will be described in more detail below, multiple computing environments may exist in the physical space, and therefore different modes may be applicable. The system may switch between modes, or zone sets, as appropriate. For example, a system may have three modes: a television mode, a laptop mode, and a phone mode. The system may identify the appropriate mode and implement a gesture package for that particular mode that comprises the gestures applicable in the zones in the physical space. For example, if the computing environment detects that the output is to a television screen, the system may implement the zones in the television mode and analyze the user's gestures with respect to those zones. If the output is changed to a laptop, the system may switch to the zones in the laptop mode. The mode implemented and the way the zones are defined in a mode may be influenced by several factors, as described in more detail below.

In the example shown in FIG. 2A, the computing environment 210 may be a personal computer, where the user may be at varying distances from the personal computer 212 and/or a display device 212 connected to the personal computer 212. In FIG. 2A, the physical space 201 is divided into four example zones 204a, 204b, 204c, 204d of gesture detection based on a distance from the capture device 208. The system may detect that the user is, for example, very close (touch/tablet or surface computer), relatively close (arms length from the screen), or at distances further away. For exemplary purposes, the zones may be defined as follows:

Zone 1: (h=0) Touch. User is touching the screen;

Zone 2(h<=15 cm) Close. Cell phone case, portion of user making relevant gesture is very close to the sensor device;

Zone 3: (h=15 to 1 m) Near. PC case; User is sitting in front of their Personal Computing device (desktop or laptop);

Zone 4: (h>1 m). Far. Living room case; User is relatively far from the input sensors.

We could also characterize these inputs according to the type of gestures that are applicable in each zone. For example, the zones could be characterized as follows:

Zone 1: direct (touch) input to sensors;
Zone 2: finger scale gestures;
Zone 3: arm/partial body based gestures;
Zone 4: full body gestures.

Within each zone, a particular set of gestures may apply. For example, a set of gestures may apply for a user's interaction with the system 200 at a very close distance, and a different set of gestures may apply for a user's interaction at a further distance. The gestures may vary at varying distances, or in the various zones, to correspond to an input that would be natural for a user.

Consider if the gesture-based system 200 shown in FIG. 2A is a media room entertainment system. The user may be seated across a room from the computing environment. For example, a user playing a game may be gesturing in an open space in the middle of the room, whereas the computing environment and a display may be on an entertainment unit against the wall. Similarly, if a user is watching a movie on a screen or television, the user may be seated in a chair across the room from the computing environment and/or display. Consequently, larger gestures, such as full arm or whole body motions, may feel more natural to the user at such distances. Thus, for a media room entertainment type computing environment, it may be more often that gestures in zones 3 or 4 are applicable. However, if the user is in close range to the computing environment, a different set of gestures applicable to close range interaction may apply. For example, when the user is in close range to the display 210, small scale gestures or touch screen gestures may be more natural for a user. The gestures in zone 1 or 2 may therefore comprise touch or small finger movements or facial expressions.

Across the zones, different gestures or gestures defined in different ways may be applicable for the same controls of the system 200. For example, a gesture in zone 1, that may be small scale such as a gesture comprising a finger motion, may issue the same command to control an aspect of the system 200 as a gesture in zone 4, that may be large scale such as gesture comprising motion of the user's full arm. Similarly, intermediate zones, zone 2 and zone 3, may comprise a gesture derived from a body position or motion that is intermediate in comparison to the gesture in zones 1 and 4, but controls the same aspect of the system 200. Thus, at varying distances, or zones, from the device, varying gesture may be interpreted to issue the same command or control of the system 200. Consider a specific example where the desired command to the system is to advance the page of a document by one page, where the document is displayed on display 210. The applicable gesture may vary in each zone, and the gestures may be defined as follows: zone 1) touch the screen and drag a finger/stylus up the page); zone 2) flick the right index finger upwards by ~10 cm; zone 3) raise the right hand 30 cm; and zone 4) raise right arm 60 cm. Each of these varying gestures, applicable in the various zones, may be valid for issuing the same general command (next page/page down) to the system.

The system may identify the user's depth/position (h) in the physical space to determine in which zone the user is located. It is contemplated that any suitable manner for dividing the physical space, such as into zones, may be employed, and any suitable manner for tracking the user's position in the physical space to determine the applicable zone may be used. For example, the position may be identified with respect to two-dimensions (x, y) or three-dimensions (x, y, z). The user's position (h) may be a distance between the coordinates of the user and the coordinates of the system, such as the Euclidean distance or a distance otherwise derived from the Pythagorean theorem, for example.

In an example embodiment, the system may compare the user's depth/position (h) from the system 200 to the distances defined for each zone to determine the applicable zone, and therefore the applicable gestures. In another example embodiment, the boundaries of each zone may be defined with respect to two-dimensions or three-dimensions on a common coordinate system with the user. By comparing the user's positions with the coordinates of the zones, the zone in which the user is located may be identified.

The set of gestures that apply within a zone may overlap a set of gestures that apply within another zone or a plurality of other zones. Thus, the same gesture may be applicable for the same control in multiple zones. For example, a 'cancel' command in zone 4 may involve the user crossing their arms in front of the body, but in zones 2 and 3 the gesture for a 'cancel' command may comprise the user extending their right arm, palm outwards. There may be a set of gestures that apply across all zones, for example. Similarly, while the physical space may be divided into one zone or any number of zones, the zones themselves may be distinct, overlapping, or a combination thereof.

The system may perform efficient gesture recognition such that, near the boundaries of a zone, the system can evaluate the user's gestures within the context of multiple zones. For example, consider the 'cancel' command gesture example described above. The gesture for 'cancel' in zone 4 comprises the user crossing his or her arms in front of the body and the gesture in zone 3 comprises an extended palm motion. In this example, zone 3 extends from a distance of h=15 to 1 m and zone 4 includes the distance beyond 1 m. A user around the edge of the zone 3/zone 4 boundary should be able to use either the crossed arms or the extended palm gesture.

The system can intelligently determine the appropriate control based on a probability approach, for example. For example, the user may be in zone 4 near the zone 3/zone 4 boundary and perform the extended palm motion for the 'cancel' gesture, where the extended palm motion is actually applicable in zone 3. The system may identify that the gesture does not apply to zone 4, and may evaluate the gestures applicable in nearby zones to determine if the motion corresponds to one of those gesture. Alternately, the system may identify that the gesture applies to both zone 3 and 4, corresponding to different commands, and determine which gesture is more probably the intended gesture. The system may analyze many factors to assist in determining a probability that the user intended to perform a particular gesture. For example, the system may analyze the circumstances of the application, status of the system, characteristics of the user, active/inactive status of the user, etc.

The system can tolerate the user moving from one zone to another but still recognize gestures from the previous zone. For example, if the user moves from zone 4 to zone 3, the system may continue to recognize gestures from zone 4. Consider a user executing a gaming application, for example, that involves running or jumping gestures in zone 4. It is natural that some of a user's motion in the physical space may cause the user to move from one zone to another, even if that is not the user's intention. Different users may have a higher propensity to unintentionally overlap boundaries of a zone while performing a gesture. For example, a tall user with a long arm span may extend arm motion into other zones more often then a shorter user with smaller arm span. The system can predict the anticipated scale of gestures for a given situation based on the distance of the tracked user and utilize that information to improve system response time and accuracy. The system can predict the anticipated scale by identifying other characteristics, such as features of the user, expected controls in the system or executing application, the type of gesture previously performed, the skill level of the user, or the like.

Further, the user can move between zones and the system can seamlessly detect the user's change in position and recognize the corresponding change in a user's gestures. For example, a user may walk up to a touch screen and use a direct input gesture. Then, the user may walk back to 1.5 m away from the screen and use a full body gesture for the same control as the direct input gesture. The system can seamlessly detect the changed zone and corresponding gestures that cause the same control in the system.

The system may provide an indication to the user regarding the zone to which the user's position corresponds. This type of feedback to a user may explain why a particular gesture is not registering with the system. The user may be able to quickly identify that the user is not in the proper zone for the particular gesture. For example, an indicator could be a light bar displayed on display 210, or a physical light bar in the physical space, with an indication of each zone along the bar. The indicator could correlate the user's position to each zone, lighting up along the bar to correspond to the zone in which the user is located. If the bar is lit up between the zones, indicating that the user is between zones or close to a boundary between two zones, the user can reposition his or her position in the desired zone. In another example embodiment, the indication is a visual indication provided on the display screen, for example. In another example, the indication is an audio cue to the user, such as a voice over that informs the user that he or she has stepped out of a zone.

The indicator may help the user for proper positioning in the physical space. The system may recognize that the user's gestures do not correspond to the zone in which the user is positioned. For example, the system may recognize that, while the user is in zone 4, the user's gestures are applicable to those that correspond to zone 3. The indication may guide the user to the proper position in the physical space, or virtual zone, that corresponds to the user's gestures. The system may identify a preferred zone, such as a zone preferred for interaction with a large display or a zone preferred for interaction with a laptop. The system may communicate the preferred zone to the user via the indication, such as a visual or audio cue. Alternately, the system can adapt the zones and/or the gestures applicable in a zone to reflect the tendencies of the user.

As described above, the boundaries of each zone may be defined to correspond to the desire that gestures are natural user positions or motions with respect to the user's distance from the system. It is contemplated that the boundaries of the zones may be based on any one or any combination of features of the system, such as the capture device resolution, relative position of the capture device and a computing environment or display, the type of computing environment, the type of application executing, user preferences, RGB capabilities, screen size, available input devices, the components of the computing environment (e.g. audio/video capabilities), physical space characteristics, or the display capabilities, for example. Further, the gestures in each zone may be defined based on a feature or combination of features of the system.

FIG. 2A depicts an example set of zones comprising zones 1, 2, 3, and 4. FIG. 2B illustrates an example computing environment 211 shown as a handheld cellular device. However, while the concepts in the examples described herein with respect to a specific computing environment, such as the handheld cellular device shown in FIG. 2B, the concepts are not limited to a cellular device. As described above, the computing environment may comprise any suitable device, such as a multimedia console, a personal computer (PC), a cellular device, a gaming system or console, a handheld computing device, a PDA, a music player, a cloud computer, a capture device, or the like. Three example zones, 206a, 206b, 206c are depicted with respect to the cellular device 211, but as noted it is contemplated that any number of zones may be applicable. FIG. 2C illustrates multiple users, multiple computing environments, multiple capture devices and multiple displays that may be present in a physical space. As described below, multiple sets of virtual zones, such as zones 207a, 207b, 207c, 207d and zones 209a and 209b, may be defined in the physical space. The examples described with respect to FIG. 2A and the examples described below with respect to FIGS. 2B and 2C demonstrate ways in which several of these factors may influence the boundaries of a zone (e.g., how the zones divide the physical space, the varying sizes/locations of each zone, etc) and/or the gestures that are applicable for a zone.

Consider a computing environment that is a cell phone or small mobile device 211, such as in FIG. 2B. For a computing environment 211 that is a cell phone or other mobile device, where a user is often interacting at close range to the device, zone 1 gestures may be applicable. It may be natural for a user to use small hand/finger positions or motions when in close range to a handheld cellular device 211. When a user is in close range to the cellular device, for example, the user may find it intuitive to use small motions and view changes on a small display component integrated into the cellular device. Thus, gestures applicable to zone 1, that are in close range distance to the computing environment, may be applicable.

Numerous characteristics may influence the manner in which the zones virtually divide the physical space and/or the gestures that are applicable to each virtual zone. Consider if the user is conducting a phone call using the cellular device 211. A capture device 213 and small display 214 may be integrated into the cellular device 211. For mobility and the convenience of not having to hold the cellular device, the user 202 may place the cellular device in a fixed position in the physical space and wear an audio piece for communicating via the cellular device while moving about the room. The capture device 213 may capture the user's gestures within view of the capture device. Rather than output a display to the small screen 214 integrated into the cell phone, the cell phone may be connected to a larger display device 212 and output the results to the larger display 210.

Thus, at further distances from the cellular device 213 it may be more natural for a user viewing the output to the large display 210 to use larger gestures that comprise an arm or leg, for example. Also, FIG. 2B illustrates how a different set of zones for a particular computing environment, such as cellular device 211, may divide the physical space differently than the zones associated with another computing environment, such as computing environment 210 shown in FIG. 2A.

A resolution or the distance-related capabilities of a capture device may influence the boundaries of the zones and/or the applicable gestures. For example, it may be natural for the gestures applicable to control cellular device 211, with an integrated capture device 212, to comprise small motions regardless of the distance from the computing environment 211. As described above, there may be instances in which the user moves further from the cell phone or other mobile device, such as into zones 2, 3, or 4. However, the same small hand/finger positions or motions applicable in zone 1 may apply at any distance or in any zone, as it is contemplated that the capture device can have a resolution that captures even the slightest motion regardless of the distance.

Thus, the boundaries, or relative distance, of each zone, and therefore the gestures that apply based on distance, may be influenced by the resolution of the capture device. For example, a lower resolution camera may have poor or lower quality at further distances. The camera may recognize finer gestures closer to the camera but require larger scale gestures for recognition at further distances from the capture device. A higher resolution capture device, on the other hand, may be able to recognize small scale gestures at much greater distances, providing flexibility in the scale of gestures that can be recognized throughout the zones.

In another example, the boundaries of each zone may be based on features of a display component. For example, it may be desirable that the gestures are natural user positions or motions with respect to the size of the display component. For a small display, such as display 214 on cellular device 211, it may be natural to the user to make small motions that correspond to the small display. For example, if the gesture corresponds to scrolling through a list displayed on the small screen, the gesture may comprise the user making small up and down motions with the user's finger such that the motion correspond to the size of the list displayed on the small screen. Thus, the gestures for interacting with a small display, such as the gestures in zone 5, 6, and 7, associated with cellular device 211 in FIG. 2C, may be more generally defined by small motions. However, the gestures in zones 1, 2, 3, 4 for interacting with a large display, such as display 210, may be more generally defined by large motions. For example, whether the user is in close range or far range to a large projection screen, it may be more natural for the user's motion for scrolling through the list to correspond to the size of the list displayed on the large screen. If the distance in the physical space is a one-to-one translation, the screen size will have a direct impact on the scale of the gesture. For example, consider a gesture that corresponds to movement covering the distance from a top of a display portion of the display device to a bottom of the display portion of the display device. Thus, the set of gestures in a particular zone or across zones may vary according to the size of a display component.

The type of display component may influence the gestures applicable in a zone. For example, consider a tablet computing environment or a display component having touch screen capabilities such that the computing environment can detect the presence and location of a touch within the display area. Thus, when the user is in close enough range to the computing environment, it may be desirable that some gestures for control of the system 200 comprise direct contact with the system 200. At further distances from the display, such as in zone 2, 3, or 4, the gestures may be defined by non-contact motions or gestures based on other factors, such as what would be natural to the user at that distance or the resolution of the camera, for example.

The application executing on the system and/or the available system components may have a determinative effect on the zones and the boundaries of each zone. For example, a user may be interacting with a cellular device 211 to play a game. The user may need to be in close range to the computing environment to view the game on the screen, such as the small screen integrated into cellular device 211. Thus, it may be more natural for a user to use small hand/finger positions or motions when in close range, and the gestures in that zone may be defined accordingly. In another example, however, the user may be executing a presentation application. Perhaps the presentation is being displayed on a larger screen for an audience, but the capture device capable of capturing data representative of the user's gestures is integrated into the user's cellular device. The user may position the cellular device in the room such that the user is in the capture devices field of view, but the gestures may be large, body gestures, to control aspects of the presentation displayed on the large screen. It may be more natural for the user to be standing or moving in the physical space and use larger gestures because of the application executing and the output to a larger display, even if the user is within a close range distance from the cell phone.

The system may be tuned such that user preferences can influence the boundaries of the zones or the gestures that apply in each of the zones. For example, the user may deactivate certain zones, the user may deactivate all zones, or the user may direct the system to use a standard set of gestures regardless of the user's position in the physical space. Consider an application in which it would be more natural to use larger motions at a further distance from the input sensor and the zones are defined as such. However, consider a user that is seated in a zone, where the gestures in that zone comprise large body motions. However, the user's motion may be restricted, such as if the user is holding a small child or has a broken leg, for example. The user may direct the system to apply smaller zone 1 gestures to the entire physical space such that the user can perform the smaller gestures in the seated position but still interact with the system. The user preferences may therefore alter the applicable gestures and/or the zones for a specific user or other users of the system. The altered gestures may apply temporarily, such as for a current execution of an application, or the changes may apply for a longer period of time, such as until a user changes his or her preferences.

As noted, any suitable computing environment, including the capture device itself, may process the capture data. For example, the computing environment 210, 211 in FIG. 2A or the capture device 208 may have the processing capabilities to process the capture data. The computing environment may employ gesture recognition techniques on the capture data to determine if the user has performed any gestures in the physical space. If the physical space is divided into virtual zones, as shown in FIGS. 2A and 2B, the computing environment may first determine which zone is applicable to determine which gestures are applicable. Thus, any capable component of the system can determine the user's position and identify the corresponding virtual zone in the physical space based on any suitable method.

The positioning of the components in the system 200 may influence the manner in which the virtual zones are defined and the manner in which the user's position is determined. For example, the zones may be defined in relation to the capture device that captures the depth of the user from the perspective of the capture device. However, the zones may be translated by the capture device to be defined from the perspective of another component in the system 200. By comparing the relative position of the user position with a component of system 200, the system can interpret and translate the scale of input gesture appropriately.

In an example embodiment, the zones are defined in relation to the capture device. It is contemplated that the capture device may be fixed in one position or it may be capable of moving to change the field of view. For example, the capture device 208 in FIG. 2A may have the ability to swivel left and right to track a user in the physical space such that the user remains in the camera's field of view. As the capture device moves to change the field of view, the zones may change accordingly to correspond to the perspective of the capture device. The computing system may identify, from the captured data, the distance of the user from the location of the capture device to determine the user's zone. Further, if the capture device is moved to a different location, the zones may be redefined with respect to the capture device location. In an example embodiment, the system may identify the preferred position of the capture device for gesture recognition and scaling and the user can position the capture device accordingly.

In the example shown in FIG. 2C, a capture device 208 is positioned on the wall. Thus, the depth captured from the perspective of the capture device 208 may not be from the same perspective as the distance from computing environment 210 or display 210, for example. However, the zones may be defined based on the positioning of a component other than the capture device, such as the computing environment or a display component. The capture data may indicate the user's depth or position in the physical space with respect to other system components. The system may analyze the captured data to identify the bounds of the physical space, such as identifying objects, walls, the floor, etc. The system can use the information about the physical space and translate it to reflect a different position in the physical space, such as from the display, a capture device positioned on the wall, a computing environment, or the like. For example, if the zones are defined based on the position of the display device, for example, the distance of the user from the display device may be evaluated to determine the user's zone. Consider another example in which the capture device that captures the data is integrated into the computing environment, such as the cellular device 211 shown in FIGS. 2B and 2C. The zones may divide the physical space in the same or similar manner with respect to both the capture device and the computing environment, and thus minimal or no translation may be necessary for properly determining the user's zone.

In another example embodiment, the computing environment may extrapolate the user's position from the computing environment or the display based on the depth data captured from the perspective of the capture device. For example, the computing environment may include compensation for the position of the capture device in relation to the computing environment or the display. In FIG. 2C, the capture device 208 that captures the depth of the user may be positioned at some distance from the computing environment 211 and display 210. however, zone 1 may include the close-range region with respect to the display 210, including a touch/contact region. The computing environment may determine the user's depth from the perspective of the capture device. The system may use the difference in position between the capture device and the display 210 to determine the user's distance from the display 210. In another example, the system may translate the user's distance to correspond to a position and perspective of the display 210 such that the applicable zone is defined from the perspective of the display 210. By employing such techniques, or similar techniques, the system may compensate for the differences in position such that it appears to the user that he or she is interacting directly with the display.

The system may resolve the user's position in the physical space with respect to any point in the physical space. For example, each device in the system can be calibrated to understand the physical space in terms of a three dimensional coordinate system having x, y, and z axes with a common point of origin. From the captured data, the user's position may be defined on the common, virtual coordinate system representing the physical space and the zones may also be defined with respect to the common coordinate system. The user's x, y, z position defined on the common coordinate system can therefore be compared to the boundaries of each zone. The use of a common coordinate system to characterize the physical space may make the position of device capturing the depth of the user inconsequential to the determination of the user's position in the physical space because the system may calibrate each component accordingly.

Any suitable technique is contemplated for defining the boundaries in the physical space and for determining the user's position with respect to those boundaries. Location-based techniques may be employed, from simple distance and positioning based on a common coordinate system to techniques involving global positioning (e.g., GPS). For example, location information pertaining to the user may be received from a variety of types of position determining equipment having different underlying technologies, such as: GPS (Global Positioning System); angle of arrival (AOA); time difference of arrival (TDOA); Line of Sight (LOS); etc.

The system can understand input gesture data coming from disparate sensors. For example if the user is using a system capable of understanding touch and three dimensional inputs (such as a surface computing device fitted with a depth camera), a single gesture may comprise motion in more than one zone. For example, the gesture may comprise a left to right sweep of the left arm starting ten cm out from the sensor, then comprise a touch of the screen during the apex of the curve, and finish with the arm to the right, again 10 cm out from the screen. This gesture input may be interpreted as a continuous left to right movement by the system even if the gesture comprises motion in both zones 1 and 2, for example. Similarly a gesture may involve data captured from a capture device that may or may not need to use distance scalable information to produce the optimal experience. For example, a gesture may comprise a combination of a voice command and a motion. The capture device may comprise an audio sensor may identify a voice command that can control an aspect of the system.

As shown in FIG. 2C, a user 202, 230 may be in a physical space divided into various sets of zones, such as when a user is in view of multiple capture devices or if there are multiple computing environments receiving data from at least one capture device. More than one capture device may capture a user. For example, the system may switch between capture devices or merge captured data from more than one capture device. In FIG. 2C, for example, the user may be in a field of view of both capture devices 208 and 213. The system may merge data from the capture devices to increase the data analyzed for gesture recognition.

In an example, the user 202 or 230 shown in FIG. 2C may move out of range of the field view of a first capture device 208 but into a field of view of a second capture device. For example, if a user 202 is moving between rooms in a house or office, the user 202 may move in and out of view of capture devices located in different rooms. In another example, the user may move out of range of capture device 208 but still be captured by capture device 211 on the user's cellular device 213. The system 200 may analyze the captured data from either capture device 208, 213 such that gesture recognition can continue seamlessly to the user despite the switch between capture devices.

The system may identify gestures for multiple users in a physical space, where the users may be in different zones with respect to the same component in the system 200. A capture device in the physical space may be focused on a respective user, or a capture data may capture data with respect to several users. The system may sort the data for each respective user for purposes of gesture recognition. For example, the system may correlate a portion of the capture data to a user based on the user's position in the physical space or an identity of the user recognized by the system.

The system may also intelligently transition between applications or interfaces based on a user's position in the physical space. For example, if user 230 moves from zone 2 into zone 4, the system may detect the movement between zones and change application that is executing and/or switch between executing applications. Thus, the user's distance from a component in the system may control the application that is selected for execution or dictate the displayed interface/application on the display device. For example, user 230 could be typing on a keyboard close to the computing environment 212, is in zone 2, and the computing environment 212 is executing a media player and displaying a user interface for the media player on the display device. The user 230 may walk away from the keyboard and move into zone 4. The system may recognize the movement and change the display from the media player user interface to a media center interface or a different application that corresponds to the user's modified position. Thus, if an activity has complementary application interfaces that are associated with distance or position in the physical space, the system can automatically migrate from one experience to another based on the user's active distance from a component in the system, such as the capture device or display.

Similarly, the system may modify aspects of the executing application and/or corresponding display based on the user's distance. For example, if a user is interacting with a word processing document and is close to the computing environment, such as in zone 1 or 2, the system may display words on the screen in a small font. However, if the user backs up and moves to zone 3 or 4, for example, the font size may increase with the user's increased distance from the display. The user may select for this to happen, or it may be automatic.

The system 200 may identify the computing environments connected directly or otherwise connected via the network, such as computing environments 210, 211 and any remote computing environments that share information over a network with the local computing environments 210, 211. The captured data may be provided to multiple computing environments and the computing environment(s) can process the data suitably for that environment. For example, the capture device 208 may provide data representative of either or both users 202, 230 to cellular phone 211, and cellular phone 211 can use the data to identify the user's position with respect to the zones applicable to the cellular phone. The zones may be specific to the cellular phone, such as the zones 5, 6, and 7 shown. Similarly, the capture device 208 may provide the same data representative of a user 202, 230 to computing environment 210, and computing environment 210 can use the data to identify the user's position with respect to the zones 1, 2, 3, and 4 applicable to the computing environment 210.

In FIG. 2C, the example set of zones, zones 1, 2, 3, and 4, may be defined from the perspective of display 210 and apply to both computing environments 210, 211. For example, consider the user 202 captured by capture device 208 where the user is positioned in close range to the cellular device 211 but across the room from the computing environment 210.

There may be a single set of zones that divide the physical space, where the single set of zones are applicable to more than one computing environment. For example, the set of zones 1, 2, 3, and 4 may apply to both computing environments 210, 211 such that the gestures in zone 4 apply to both computing environments 210, 211. Consider, for example, that display 210 is displaying a virtual calculator and the user 202 gestures with respect to display 210 to select numbers on the displayed calculator. The same gestures may be applicable to the cellular phone 211. A gesture in zone 4 may comprise movements of a pointed finger, where a pointer displayed on the screen corresponds to the motion such that the user can point to numbers on the calculator via the moving pointer. A gesture for the selection of a number may comprise a clutching motion once the pointer is on the desired number. The system may recognize that the user is in zone 4 and recognize the gesture as applicable to zone 4 for the particular control of number selection. The user may view numbers on a small display screen of cellular device 211. The same scale gesture comprising moving a finger around in the physical space may control a pointer on the display screen of the phone 211. Thus, the user may move the pointer on the screen of device 211 and select a number using the same gestures.

The sets of zones may divide the physical space differently for different computing environments. Thus, multiple sets of similarly defined zones may be positioned differently in the physical space to correspond to a particular computing device, but the number of zones and gestures applicable in each zone may be similar between multiple computing environments. For example, zones 1 and 5 (the zones that are in close range to each respective computing environment, 211 and 210) are the same, including the same set of gestures at close range.

Alternately, the gestures in each zone may vary between different sets of zones depending on various factors, such as the type of computing environment, camera resolution, the size of the display, the type of applications that execute on the computing environment, the typical use of the particular computing environment, or the like. For example, the zones applicable to cellular phone 211 may be a different set than those applicable to computing environment 210. Thus, the gestures defined across zones 5, 6, and 7, applicable for the cellular phone, may be different from the gestures defined across zones 1, 2, 3, and 4, applicable to the computing environment 211. The gestures applicable to the cell phone, for example, may be mostly small finger gestures at varying distances throughout each zone, zone 5, 6, 7, and the gestures applicable to the computing environment 211 may be mostly large body gestures at varying distances in the zones 1, 2, 3, and 4.

The gestures in the different sets of zones may be sufficiently distinct, thus lessening the risk that computing environment 210 will interpret a user's gesture that is intended for the cellular phone 211, and vice versa. For example, the zones may be arranged such that the user is in zone 5 with respect to the cellular phone 211 and in zone 3 with respect to the computing environment 211. The user's gestures in zone 5, at close range to cellular phone 211, may be small finger gestures or touch screen gestures. If the gestures in zone 3 applicable to computing environment 210 are large gestures that involve the arms and legs, for example, the user's gestures may be recognized the cellular phone 211 and not recognized by the computing environment 210.

In another example embodiment, a set of zones or the computing environment itself may be set as active or inactive. An inactive computing environment may not analyze the captured data for gesture recognition or may not even receive captured data. For example, the capture device(s) may identify an active computing environment and provide the captured data to the active computing environment. If the computing environment receives the capture data, the zones may be inactive such that the capture data is not analyzed or is analyzed with respect to a default set of gesture data.

Multiple computing environments may be active. Thus, a user's gesture may control aspects of multiple computing environments. In an example embodiment, gestures may inherently control the appropriate computing environment based on the distinct sets of gestures between computing environments. In another example embodiment, a gesture may comprise an indication of the computing environment to which the gesture applies. For example, the system could identify each computing environment in the physical space, or otherwise connected to the system, by number. Prior to a control gesture, the user could perform an indicator gesture, such as a waving the number of fingers that corresponds to the number of the computing environment of interest. The gesture following the number may be applied to the selected computing environment. The selected computing environment could remain as the primary computing environment until the user changes it or selects a different computing environment as the primary. Thus, the user may not have to perform the indicator gesture each time, but just to switch between active computing environments.

Multiple capture devices may be present in a physical space. The captured data from multiple capture devices may be merged. For example, a first capture device may capture data representative of the user, and a second capture device may capture data representative of the same user. The data from the first and second capture devices may be shared with other components in the system 200, such as the computing environment. The computing environment, for example, may analyze the captured data from both capture devices and merge the data. The captured data may comprise a series of images with timestamps. Each capture device may capture data at varying timestamps, so combining the data may increase the number of images that represent the user.

In another example embodiment, at least one capture device may be selected as the primary capture device for capturing data representative of the user. As shown in FIG. 2C, an example first capture device 208 is positioned on the wall and an example second capture device is integrated into the cellular phone 211. The capture devices may communicate with each other, such as via Bluetooth communication or other network connection. The captured data from each capture device may be shared and provided to a computing environment, such as 210 or 211. In an example embodiment, the captured data is merged and a computing environment can analyze the merged data for gesture recognition. In another example embodiment, a capture device may be selected for capturing and providing the data representative of the user's gestures. The capture device selected out of multiple capture devices may be selected based on a variety of reasons including but not limited to its resolution, battery life, view of the user, networking capabilities, etc. For example, despite having an integrated capture device, computing environment 211 may select to receive data from capture device 208 if it has better resolution.

The user may set the active or inactive status of a capture device, computing environment, or zones. The user may set the active or inactive status via a gesture. For example, a gesture for causing an inactive status for a computing environment may comprise an open hand facing the computing environment of interest, and slowly motioning downward with straight fingers. The reverse may activate the zones.

Consider, for example, a user's cellular phone 211 that may be on a table next to the user while the user is playing a game executing on computing environment 210. While not intended by the user, a user's gesture with respect to computing environment 210 could be analyzed by and/or applicable to the cell phone 211. Thus, the user may unintentionally cause the cellular phone 211 to perform some function based on the user's gestures intended for computing environment 210. The user may wish to deactivate or set the zones to inactive for cellular device 211 to avoid unintentional controls. The system may prompt the user to identify the computing environments to receive and/or process captured data. For example, computing environment 210 may receive an indication that a second computing environment 211 is nearby. The computing environment may output a list of identified computing environments on the display 210 and ask the user to identify the pertinent computing environments for a session.

Multiple users may be present in the physical space. A capture device may track multiple users or focus on a particular user. A capture device may be dedicated to capturing data for a single user or may track multiple users. The cellular device 211 may identify the user via body or voice recognition techniques, for example, and associate the captured data to the particular user.

It is contemplated that a single device may perform all of the functions in system 200, or any combination of suitable devices may perform the desired functions. For example, the computing device 210 may provide the functionality described with respect to the computing environment 212 shown in FIGS. 2A-2C or the computer described below in FIG. 7. The computing device 210 may also comprise its own camera component or may be coupled to a device having a camera component, such as capture device 208.

It is contemplated that any number of computing environments and any number of capture devices may be connected. For example, various devices or components in a gesture-based system may handshake with each other via a network and communicate to share information. For example, the capture device and each computing environment may communicate over a wired or wireless connection, such as via a cable connection, a Wi-Fi connection, or a home wireless network, for example. The various capture devices may share the captured data with each other or provide them to a computing environment for processing and interpreting for control of an aspect of they gesture-based system. An example network setup is described in more detail below with respect to FIG. 3.

The components of a networked system can share information locally within a location or remotely across locations. In an example embodiment, the local computing environment receives the data representative of user from the capture device. The computing environment may output to a local display, such as a display component of the computing environment or another display device otherwise connected to the computing environment 302. The computing environment may alternately or also provide the data to a remote computing environment or a remote display component for display. For example, computing environment may communicate with computing environment over a network. Computing environment may receive data from the computing environment and map the gestures of user to a display component local to computing environment.

Thus, by communicating over a network 250, any number of users may interact with a plurality of other users via gestures. For example, gestures performed in a first location can be translated and mapped to a display in a plurality of locations, including the first location. As described above in the examples shown in FIGS. 2A-2C, zones may be defined in a physical space that indicates the applicable zones at varying distances. As described above, the zones may be defined based on a number of factors, including a camera resolution, a type of computing environment, an executing application, etc. Thus, the zones 351 in Location #1 may divide the physical space into zones differently than the zones 352 in Location #2 or zones 353 in Location #3 based on a variety of factors. For example, each capture device may have a varying resolution or distance-related capability and each location may have zones of gesture data. A user in each location may gesture appropriately for the zone in which they are in, which may be tailored to the capture device for which the user interacts. For example, a user 314 in location #3 may interact with the mobile handheld device 304 at a close range. A user 322 in location #1 may interact with a computing environment 302, such as a personal computer, at longer distances. A gesture by different users at different distances from different computing environments comprising different motion or user position may issue the same command to the system.

Figure 3A:
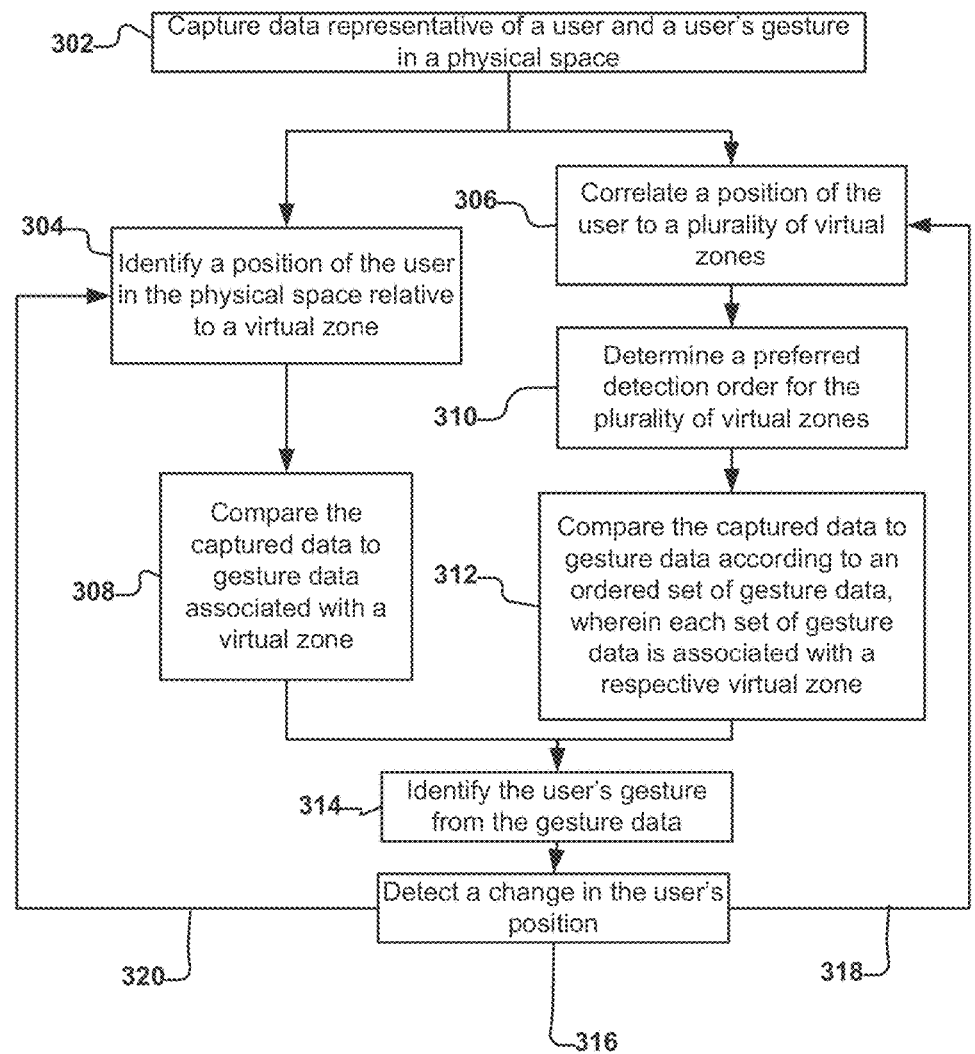
FIG. 3A depicts an example flow diagram for identifying a user's gesture with respect to virtual zones that each represent a portion of the physical space.

FIG. 3A depicts an example flow diagram for a method of identifying a user's gesture from capture data with respect to a plurality of virtual zones. For example, any gesture-based system such as that shown in FIGS. 1-3 may perform the operations shown here.

At 302, a system may receive data from a physical space that includes a target, such as a user or a non-human object. As described above, a capture device can capture data of a scene, such as the depth image of the scene and scan targets in the scene. The capture device may determine whether one or more targets in the scene correspond to a human target such as a user. For example, to determine whether a target or object in the scene corresponds to a human target, each of the targets may be flood filled and compared to a pattern of a human body model. Each target or object that matches the human body model may then be scanned to generate a skeletal model associated therewith. For example, a target identified as a human may be scanned to generate a skeletal model associated therewith. The skeletal model may then be provided to the computing environment for tracking the skeletal model and rendering a visual representation associated with the skeletal model.

Any known technique or technique disclosed herein that provides the ability to scan a known/unknown object, scan a human, and scan background aspects in a scene (e.g., floors, walls) may be used to detect features of a target in the physical space. The scan data for each, which may include a combination of depth and RGB data, may be used to create a three-dimensional model of the object. The RGB data is applied to the corresponding area of the model. Temporal tracking, from frame to frame, can increase confidence and adapt the object data in real-time. Thus, the object properties and tracking of changes in the object properties over time may be used to reliably track objects that change in position and orientation from frame to frame in real time. The capture device captures data at interactive rates, increasing the fidelity of the data and allowing the disclosed techniques to process the raw depth data, digitize the objects in the scene, extract the surface and texture of the object, and perform any of these techniques in real-time such that the display can provide a real-time depiction of the scene. Further, the capture data may be captured by a plurality of capture devices. Thus, a collection of data representative of the user's gestures, from various sources, may be merged. The collection of data may comprise images taken at different times and thus combining the data may provide an increased fidelity in the data representative of the user.

The system may identify a position of the user in the physical space from the captured data at 304. Alternately, at 306, the position of the user may be defined relative to a plurality of virtual zones. A virtual zone is a virtual space representative of a portion of the physical space. The gesture-based system may compare the captured data to gesture data associated with one of the plurality of virtual zones at 308.

In another example, the system may correlate a position of the user at 308 to a plurality of virtual zones. For example, the user's position in the physical space may correlate to a plurality of virtual zones at 306. The gesture data associated with the virtual zone may be a set of gesture data associated with the virtual zone, where each virtual zone has a respective set of gesture data associated thereto. If the user's position in the physical space correlates to a plurality of virtual zones, a preferred detection order may be applied at 310. The preferred detection order may order the plurality of virtual zones in a certain manner. The preferred detection order may be based on the user's distance from each of the plurality of virtual zones.

The gesture data compared to the captured data, at 312, may be associated with a virtual zone that correlates to the user's position in the physical space. For example, as described above, the user's position in the physical space may be identified as being within a boundary of one of the virtual zones. For example, in an example, four virtual zones, zone 1, zone 2, zone 3, and zone 4, represent four portions of the physical space. The user in this example may be positioned within the boundaries of zone 3. The user's position may be identified as within the boundaries of zone 3 and, thus, the set of gesture data associated with zone 3 may be used for comparison to the captured data. It is also noted that zones may overlap, thus two zones may comprise at least the same portion of the physical space and a user's may be positioned in two virtual zones at the same time.

Consider the example above, where four virtual zones, zone 1, zone 2, zone 3, and zone 4, represent four portions of the physical space. The user's position may be identified as within the boundaries of zone 3, and thus the user's position may correlate to virtual zone 3. However, the user's position may correlate to other virtual zones. For example, a user's position may correlate to a virtual zone if the position of the user is within the portion of the physical space represented by the virtual zone, the position of the user is within a predetermined distance from the portion of the physical space represented by the virtual zone, or the position of the user is adjacent to a boundary of the virtual zone. The correlation to more than one zone enables the system to adjust gesture recognition to a zone that may not directly correlate to the user's position. In this manner, if the user is between zones or near the boundary between two zones, the gesture recognition techniques may be flexible and account for the user's gesture intended for a nearby zone.

The preferred detection order may be determined based on a probabilistic approach. For example, the zone in which the user is positioned may be first in the preferred detection order, as the zone in which the user is positioned is most probably representative of the set of gestures that apply to the user's position. However, the user's gesture may not register with the gesture data associated with that zone, or it may register but the system may output low confidence rating. The system may compare the captured data to a set of gesture data associated with a next virtual zone based on the preferred detection order. The next virtual zone in the order, for example, may be the next closest zone to the user's position, where the user's position is close to a boundary of the virtual zone. Thus, the preferred detection order may be an order of virtual zones that corresponds to an increasing distance from the user's position. A user's distance from a virtual zone may be defined by the user's position from a central point of a zone or a boundary of the zone. The virtual zone may correspond to the user's position if the distance is a predetermined value, such as that set by the system or by the user.

The user's position may correlate to more than one zone if the user's position changes and crosses a boundary between virtual zones within a predetermined time period. For example, the system may detect that the user moves in the physical space from a first virtual zone into a second virtual zone during the middle of a gesture. In an example embodiment, the first virtual zone in the preferred detection order may be the initial virtual zone that corresponds to the user's position at the beginning of the gesture.

In another example embodiment, the system may identify both zones and may compare the user's gesture to sets of gesture data applicable to each of the virtual zones and identify the gesture from the combination of gesture data sets. In this manner, the system may identify the user's gesture as the gesture that corresponds best, e.g., a higher confidence rating that a gesture was performed, as a result of a comparison of the captured data to both sets of gesture data. Thus, the preferred detection order of the plurality of zones may be determined based on the confidence rating or level of correlation between the captured data representative of the user's gesture and the gesture data in the sets of gesture associated with each of the plurality of virtual zones.

By comparing the captured data, that is representative of the user's gesture, to gesture data for a virtual zone, a selected set of gesture data, or multiple sets of gesture data, the system may identify a user's gesture at 314. For example, to determine if a gesture was performed, the gesture recognition may use gesture information from a gesture profile personalized for a user to identify the user's gestures. The identification of the user's gesture may be performed in real time with respect to the rate of date capture of the user's gesture in the physical space. Thus, the recognition of the gesture, and therefore the corresponding control of the system, may be in real time and appear seamless to the user. The user's gesture may correspond to a control of an aspect of the system. Thus, within the varying virtual zones that represent the physical space, varying sets of gestures may apply within each zone, and thus, the user's position in the physical space may control which gestures will register with a control of the system.

The system may detect a change in the user's position at 316 and transition to a different set of gesture data, either by way of 318 or 320. The transition may be done in real time and it may be seamless to the user. Thus, as the user moves around in the physical space, different gestures may be recognized by the system for the same control. The varying sets of gesture data enable the system to recognize gestures of different scales, as a particular scale of gestures may be more natural for a user depending on the user's position in the physical space. For example, when the user is close to the screen, it may be more natural for the user to touch the screen or use small finger-scale gestures. However, at larger distances, it may be more natural for the user to make large-scale gestures that comprise more parts of the body, for example.

Figure 3B:
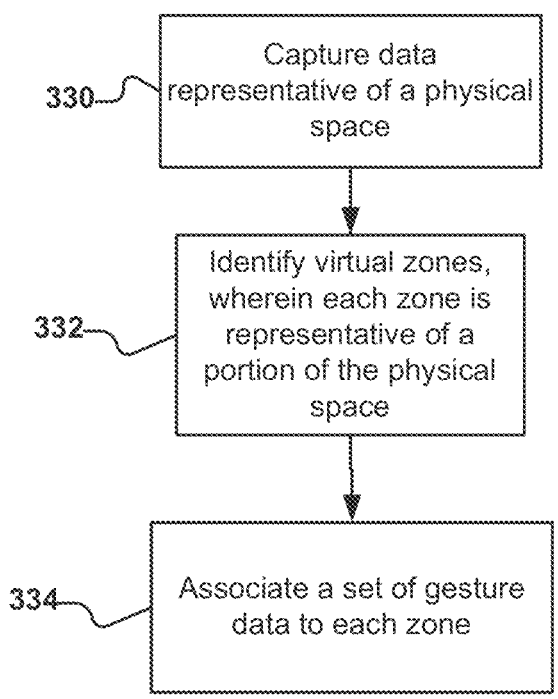
FIG. 3B depicts an example flow diagram for associating a set of gesture data for each virtual zone that represents a portion of the physical space.

FIG. 3B depicts an example flow diagram for a method of associating gesture data to virtual zones in a physical space. At 330, the system may capture data representative of a physical space. The system may identify virtual zones at 332 and apply them to the physical space such that each of the virtual zones is representative of a respective portion of the physical space.

The set of gesture data associated with a virtual zone may be based on the type of input available within the bounds of the virtual zone. For example, gestures defined by touch screen inputs may comprise a set of gesture data within a virtual zone that is defined in a portion of the physical space that is in a contact region with a component of the system.

As described above, the virtual zones identified at 332 may be defined from the perspective of a component in the gesture-based system. In an example embodiment, the system may capture data representative of the physical space and partition the physical space into virtual zones such that a plurality of virtual zones define the physical space. In another example embodiment, the virtual zones may be predetermined such that the system applies the virtual zones regardless of the size of the physical space. For example, a capture device may have a resolution of 10 m, where within a 10 m radius from the capture device the capture device is able to capture data from the physical space sufficient for gesture recognition. The virtual zones may be defined with respect to the resolution of the capture device. For example, there may be 10 zones, each spanning a radial distance of 1 m from the capture device. However, the physical space may be smaller than the space that corresponds to the resolution of the capture device. Thus, only a portion of the possible virtual zones may apply.

For each virtual zone that applies to the physical space, a respective set of gesture data may be associated at 334. Thus, in the varying virtual zones that represent portions of the physical space, varying gestures may apply. The gestures in a set of gesture data may be scaled proportionate to the distance of the associated virtual zone from a component in the gesture-based system, such as from the capture device, for example. The gesture data in different sets of gesture data may comprise overlapping gesture data. Alternately, each set of gesture data may be unique to a specific virtual zone. Typically, a gesture corresponds to a control of the gesture-based system. For example, a gesture may correspond to a driving gesture or a gesture to open a file. By separating the physical space into virtual zones, gestures may be defined differently in different zones but correspond to the same control. For example, in a zone that comprises a contact region with a display screen, the gesture for opening a file may comprise a touch screen gesture. However, in a zone further from the screen, a different gesture, such as a hand or arm motion, may also correspond to the same control for opening a file.

A user may change preferences for the set of gesture data that is associated with a virtual zone. For example, if a zone further away from the capture device comprises large scale gestures that a user cannot perform, the user may modify the set of gesture data to comprise small scale gestures, for example.

Figure 6:
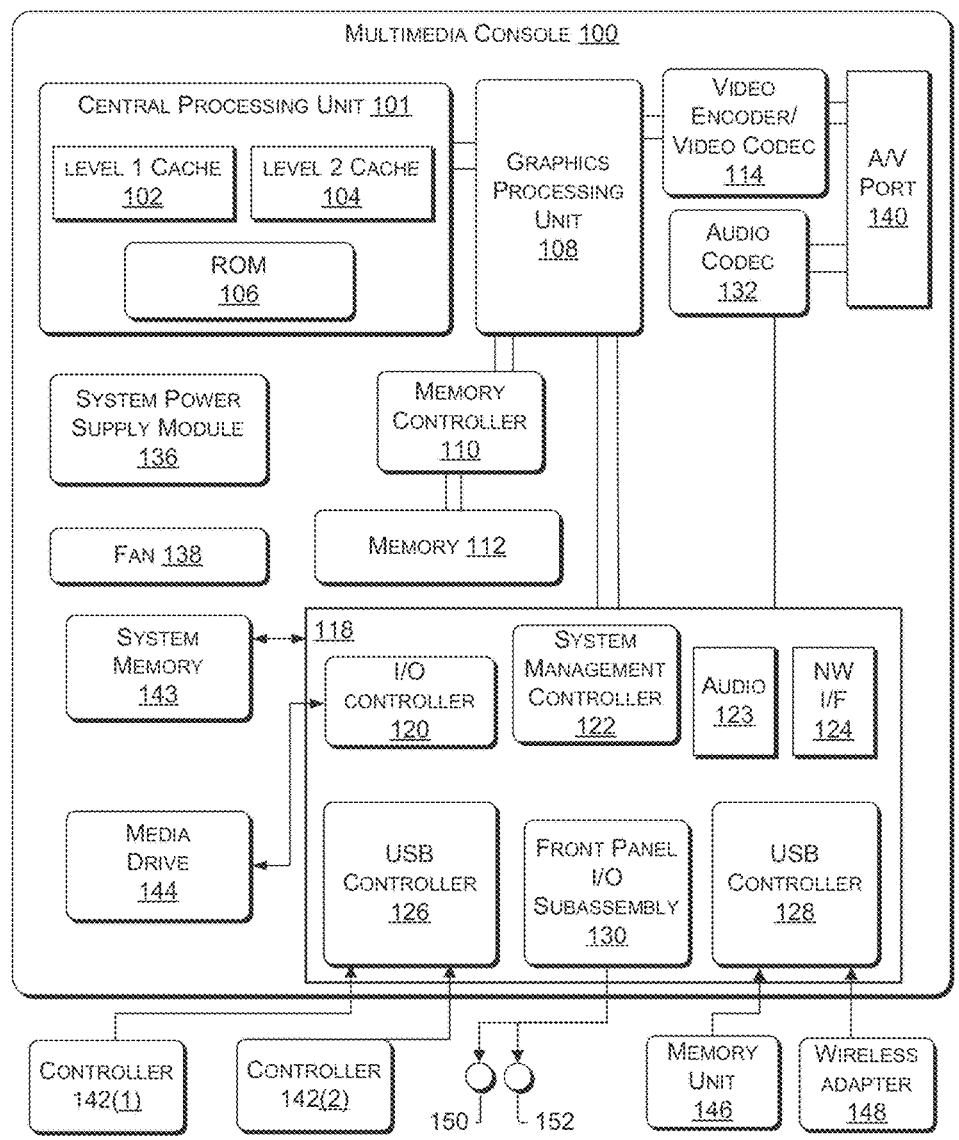
FIG. 6 illustrates an example embodiment of a computing environment in which the techniques described herein may be embodied.
Figure 7:
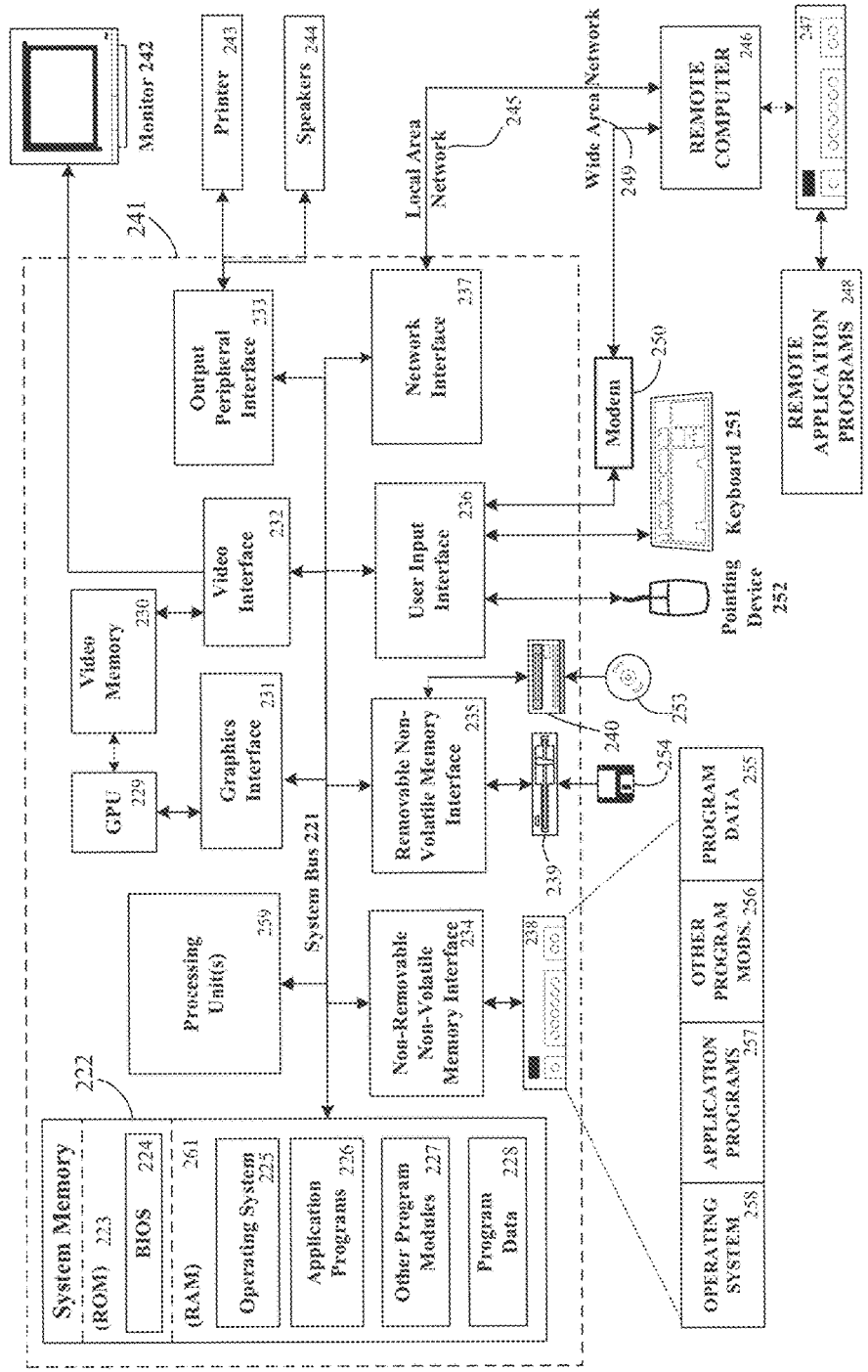
FIG. 7 illustrates another example embodiment of a computing environment in which the techniques described herein may be embodied.

In an example embodiment a computer readable storage media can store executable instructions for performing the techniques disclosed herein, such as those described in FIGS. 6 and 7. For example, a computer readable storage media can be a part of computing environment, however in other embodiments the computer readable storage media could be a part of capture device. The instructions may provide instructions for gesture recognition in the context of a plurality of virtual zones, as described above. The instructions may also provide for applying virtual zones to a physical space such that each of the virtual zones represents a portion of the physical space.

Figure 4:
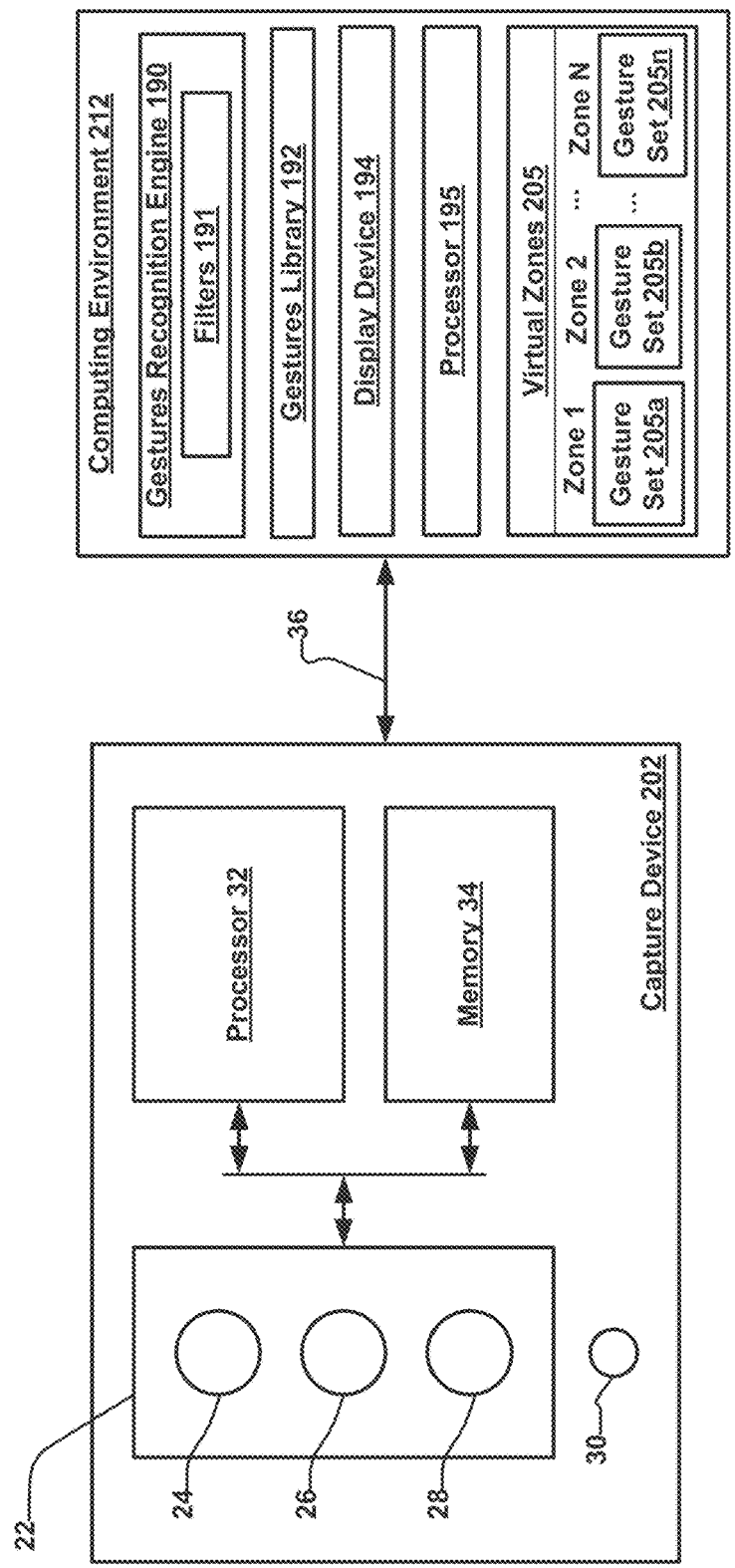
FIG. 4 illustrates an example embodiment of a capture device and an example computing environment that may be used in a target digitization, extraction, and tracking system.

FIG. 4 illustrates an example embodiment of the capture device 202 that may be used for target recognition, analysis, and tracking, where the target can be a user or an object. According to an example embodiment, the capture device 202 may be configured to capture video with depth information including a depth image that may include depth values via any suitable technique including, for example, time-of-flight, structured light, stereo image, or the like. According to one embodiment, the capture device 202 may organize the calculated depth information into "Z layers," or layers that may be perpendicular to a Z axis extending from the depth camera along its line of sight.

As shown in FIG. 4, the capture device 202 may include an image camera component 22. According to an example embodiment, the image camera component 22 may be a depth camera that may capture the depth image of a scene. The depth image may include a two-dimensional (2-D) pixel area of the captured scene where each pixel in the 2-D pixel area may represent a depth value such as a length or distance in, for example, centimeters, millimeters, or the like of an object in the captured scene from the camera.

As shown in FIG. 4, according to an example embodiment, the image camera component 22 may include an IR light component 24, a three-dimensional (3-D) camera 26, and an RGB camera 28 that may be used to capture the depth image of a scene. For example, in time-of-flight analysis, the IR light component 24 of the capture device 202 may emit an infrared light onto the scene and may then use sensors (not shown) to detect the backscattered light from the surface of one or more targets and objects in the scene using, for example, the 3-D camera 26 and/or the RGB camera 28. In some embodiments, pulsed infrared light may be used such that the time between an outgoing light pulse and a corresponding incoming light pulse may be measured and used to determine a physical distance from the capture device 202 to a particular location on the targets or objects in the scene. Additionally, in other example embodiments, the phase of the outgoing light wave may be compared to the phase of the incoming light wave to determine a phase shift. The phase shift may then be used to determine a physical distance from the capture device 202 to a particular location on the targets or objects.

According to another example embodiment, time-of-flight analysis may be used to indirectly determine a physical distance from the capture device 202 to a particular location on the targets or objects by analyzing the intensity of the reflected beam of light over time via various techniques including, for example, shuttered light pulse imaging.

In another example embodiment, the capture device 202 may use a structured light to capture depth information. In such an analysis, patterned light (i.e., light displayed as a known pattern such as grid pattern or a stripe pattern) may be projected onto the scene via, for example, the IR light component 24. Upon striking the surface of one or more targets or objects in the scene, the pattern may become deformed in response. Such a deformation of the pattern may be captured by, for example, the 3-D camera 26 and/or the RGB camera 28 and may then be analyzed to determine a physical distance from the capture device 202 to a particular location on the targets or objects.

According to another embodiment, the capture device 202 may include two or more physically separated cameras that may view a scene from different angles, to obtain visual stereo data that may be resolved to generate depth information. In another example embodiment, the capture device 202 may use point cloud data and target digitization techniques to detect features of the user.

The capture device 202 may further include a microphone 30, or an array of microphones. The microphone 30 may include a transducer or sensor that may receive and convert sound into an electrical signal. According to one embodiment, the microphone 30 may be used to reduce feedback between the capture device 202 and the computing environment 212 in the target recognition, analysis, and tracking system 10. Additionally, the microphone 30 may be used to receive audio signals that may also be provided by the user to control applications such as game applications, non-game applications, or the like that may be executed by the computing environment 212.

In an example embodiment, the capture device 202 may further include a processor 32 that may be in operative communication with the image camera component 22. The processor 32 may include a standardized processor, a specialized processor, a microprocessor, or the like that may execute instructions that may include instructions for receiving the depth image, determining whether a suitable target may be included in the depth image, converting the suitable target into a skeletal representation or model of the target, or any other suitable instruction. For example, the computer-readable medium may comprise computer executable instructions for receiving data of a scene, wherein the data includes data representative of the target in a physical space. The instructions comprise instructions for gesture profile personalization and gesture profile roaming, as described herein.

The capture device 202 may further include a memory component 34 that may store the instructions that may be executed by the processor 32, images or frames of images captured by the 3-d camera 26 or RGB camera 28, or any other suitable information, images, or the like. According to an example embodiment, the memory component 34 may include random access memory (RAM), read only memory (ROM), cache, Flash memory, a hard disk, or any other suitable storage component. As shown in FIG. 2, in one embodiment, the memory component 34 may be a separate component in communication with the image capture component 22 and the processor 32. According to another embodiment, the memory component 34 may be integrated into the processor 32 and/or the image capture component 22.

As shown in FIG. 4, the capture device 202 may be in communication with the computing environment 212 via a communication link 36. The communication link 36 may be a wired connection including, for example, a USB connection, a Firewire connection, an Ethernet cable connection, or the like and/or a wireless connection such as a wireless 802.11b, g, a, or n connection. According to one embodiment, the computing environment 212 may provide a clock to the capture device 202 that may be used to determine when to capture, for example, a scene via the communication link 36.

Additionally, the capture device 202 may provide the depth information and images captured by, for example, the 3-D camera 26 and/or the RGB camera 28, and a skeletal model that may be generated by the capture device 202 to the computing environment 212 via the communication link 36. The computing environment 212 may then use the skeletal model, depth information, and captured images to, for example, control an application such as a game or word processor. For example, as shown, in FIG. 4, the computing environment 212 may include a gestures library 192.

As shown, in FIG. 4, the computing environment 212 may include a gestures library 192 and a gestures recognition engine 190. The gestures recognition engine 190 may include a collection of gesture filters 191. A filter may comprise code and associated data that can recognize gestures or otherwise process depth, RGB, or skeletal data. Each filter 191 may comprise information defining a gesture along with parameters, or metadata, for that gesture. For instance, a throw, which comprises motion of one of the hands from behind the rear of the body to past the front of the body, may be implemented as a gesture filter 191 comprising information representing the movement of one of the hands of the user from behind the rear of the body to past the front of the body, as that movement would be captured by a depth camera. Parameters may then be set for that gesture. Where the gesture is a throw, a parameter may be a threshold velocity that the hand has to reach, a distance the hand must travel (either absolute, or relative to the size of the user as a whole), and a confidence rating by the recognizer engine that the gesture occurred. These parameters for the gesture may vary between applications, between contexts of a single application, or within one context of one application over time.

While it is contemplated that the gestures recognition engine 190 may include a collection of gesture filters, where a filter may comprise code or otherwise represent a component for processing depth, RGB, or skeletal data, the use of a filter is not intended to limit the analysis to a filter. The filter is a representation of an example component or section of code that analyzes data of a scene received by a system, and comparing that data to base information that represents a gesture. As a result of the analysis, the system may produce an output corresponding to whether the input data corresponds to the gesture. The base information representing the gesture may be adjusted to correspond to the recurring feature in the history of data representative of the user's capture motion. The base information, for example, may be part of a gesture filter as described above. But, any suitable manner for analyzing the input data and gesture data is contemplated.

In an example embodiment, a gesture may be recognized as a trigger for the entry into a modification mode, where a user can modify gesture parameters in the user's gesture profile. For example, a gesture filter 191 may comprise information for recognizing a modification trigger gesture. If the modification trigger gesture is recognized, the application may go into a modification mode. The modification trigger gesture may vary between applications, between systems, between users, or the like. For example, the same gesture in a tennis gaming application may not be the same modification trigger gesture in a bowling game application.

The data captured by the cameras 26, 28 and device 202 in the form of the skeletal model and movements associated with it may be compared to the gesture filters 191 in the gestures library 192 to identify when a user (as represented by the skeletal model) has performed one or more gestures. Thus, inputs to a filter such as filter 191 may comprise things such as joint data about a user's joint position, like angles formed by the bones that meet at the joint, RGB color data from the scene, and the rate of change of an aspect of the user. As mentioned, parameters may be set for the gesture. Outputs from a filter 191 may comprise things such as the confidence that a given gesture is being made, the speed at which a gesture motion is made, and a time at which the gesture occurs.

The computing environment 212 may include a processor 195 that can process the depth image to determine what targets are in a scene, such as a user 18 or an object in the room. This can be done, for instance, by grouping together of pixels of the depth image that share a similar distance value. The image may also be parsed to produce a skeletal representation of the user, where features, such as joints and tissues that run between joints are identified. There exist skeletal mapping techniques to capture a person with a depth camera and from that determine various spots on that user's skeleton, joints of the hand, wrists, elbows, knees, nose, ankles, shoulders, and where the pelvis meets the spine. Other techniques include transforming the image into a body model representation of the person and transforming the image into a mesh model representation of the person.

In an embodiment, the processing is performed on the capture device 202 itself, and the raw image data of depth and color (where the capture device 202 comprises a 3D camera 26) values are transmitted to the computing environment 212 via link 36. In another embodiment, the processing is performed by a processor 32 coupled to the camera 402 and then the parsed image data is sent to the computing environment 212. In still another embodiment, both the raw image data and the parsed image data are sent to the computing environment 212. The computing environment 212 may receive the parsed image data but it may still receive the raw data for executing the current process or application. For instance, if an image of the scene is transmitted across a computer network to another user, the computing environment 212 may transmit the raw data for processing by another computing environment.

The computing environment 212 may use the gestures library 192 compared to the gesture sets 205a, 205b . . . 205n in each of the virtual zones 205 such as those shown in FIG. 2A to interpret movements of the skeletal model and to control an application based on the movements. The computing environment 212 can model and display a representation of a user, such as in the form of an avatar or a pointer on a display, such as in a display device 193. Display device 193 may include a computer monitor, a television screen, or any suitable display device. For example, a camera-controlled computer system may capture user image data and display user feedback on a television screen that maps to the user's gestures. The user feedback may be displayed as an avatar on the screen such as shown in FIG. 1. The avatar's motion can be controlled directly by mapping the avatar's movement to those of the user's movements. The user's gestures may be interpreted control certain aspects of the application.

According to an example embodiment, the target may be a human target in any position such as standing or sitting, a human target with an object, two or more human targets, one or more appendages of one or more human targets or the like that may be scanned, tracked, modeled and/or evaluated to generate a virtual screen, compare the user to one or more stored profiles and/or to store a gesture profile associated with the user in a computing environment such as computing environment 212. The gesture profile may be specific to a user, application, or a system. The gesture profile may be accessible via an application or be available system-wide, for example. The gesture profile may include lookup tables for loading specific user profile information. The virtual screen may interact with an application that may be executed by the computing environment 212 described above with respect to FIG. 1.

The gesture profile may include user identification data such as, among other things, the target's scanned or estimated body size, skeletal models, body models, voice samples or passwords, the target's gender, the targets age, previous gestures, target limitations and standard usage by the target of the system, such as, for example a tendency to sit, left or right handedness, or a tendency to stand very near the capture device. This information may be used to determine if there is a match between a target in a capture scene and one or more users. If there is a match, the gesture profiles for the user may be loaded and, in one embodiment, may allow the system to adapt the gesture recognition techniques to the user, or to adapt other elements of the computing or gaming experience according to the gesture profile.

One or more gesture profiles may be stored in computer environment 212 and used in a number of user sessions, or one or more profiles may be created for a single session only. Users may have the option of establishing a profile where they may provide information to the system such as a voice or body scan, age, personal preferences, right or left handedness, an avatar, a name or the like. Gesture profiles may also be generated or provided for "guests" who do not provide any information to the system beyond stepping into the capture space. A temporary personal profile may be established for one or more guests. At the end of a guest session, the guest gesture profile may be stored or deleted.

The gestures library 192, gestures recognition engine 190, and gesture data 205*a*-205*n* may be implemented in hardware, software or a combination of both. For example, the gestures library 192, and gestures recognition engine 190 may be implemented as software that executes on a processor, such as processor 195, of the computing environment 212 (or on processing unit 101 of FIG. 6 or processing unit 259 of FIG. 6).

It is emphasized that the block diagrams depicted in FIG. 4 and FIGS. 6 and 7 described below are exemplary and not intended to imply a specific implementation. Thus, the computing environment 212 in FIG. 1, the processor 195 of FIG. 4, and the processing unit 259 of FIG. 9, can be implemented as a single processor or multiple processors. Multiple processors can be distributed or centrally located. For example, the gestures library 192 may be implemented as software that executes on the processor 32 of the capture device or it may be implemented as software that executes on the processor 195 in the computing environment 212. Any combinations of processors that are suitable for performing the techniques disclosed herein are contemplated. Multiple processors can communicate wirelessly, via hard wire, or a combination thereof.

The gestures library and filter parameters may be tuned for an application or a context of an application by a gesture tool. A context may be a cultural context, and it may be an environmental context. A cultural context refers to the culture of a user using a system. Different cultures may use similar gestures to impart markedly different meanings. For instance, an American user who wishes to tell another user to "look" or "use his eyes" may put his index finger on his head close to the distal side of his eye. However, to an Italian user, this gesture may be interpreted as a reference to the mafia.

Similarly, there may be different contexts among different environments of a single application. Take a first-user shooter game that involves operating a motor vehicle. While the user is on foot, making a first with the fingers towards the ground and extending the first in front and away from the body may represent a punching gesture. While the user is in the driving context, that same motion may represent a "gear shifting" gesture.

Gestures may be grouped together into genre packages of complimentary gestures that are likely to be used by an application in that genre. Complimentary gestures—either complimentary as in those that are commonly used together, or complimentary as in a change in a parameter of one will change a parameter of another—may be grouped together into genre packages. These packages may be provided to an application, which may select at least one. The application may tune, or modify, the parameter of a gesture or gesture filter 191 to best fit the unique aspects of the application. When that parameter is tuned, a second, complimentary parameter (in the inter-dependent sense) of either the gesture or a second gesture is also tuned such that the parameters remain complimentary. Genre packages for video games may include genres such as first-user shooter, action, driving, and sports.

Figure 5A:
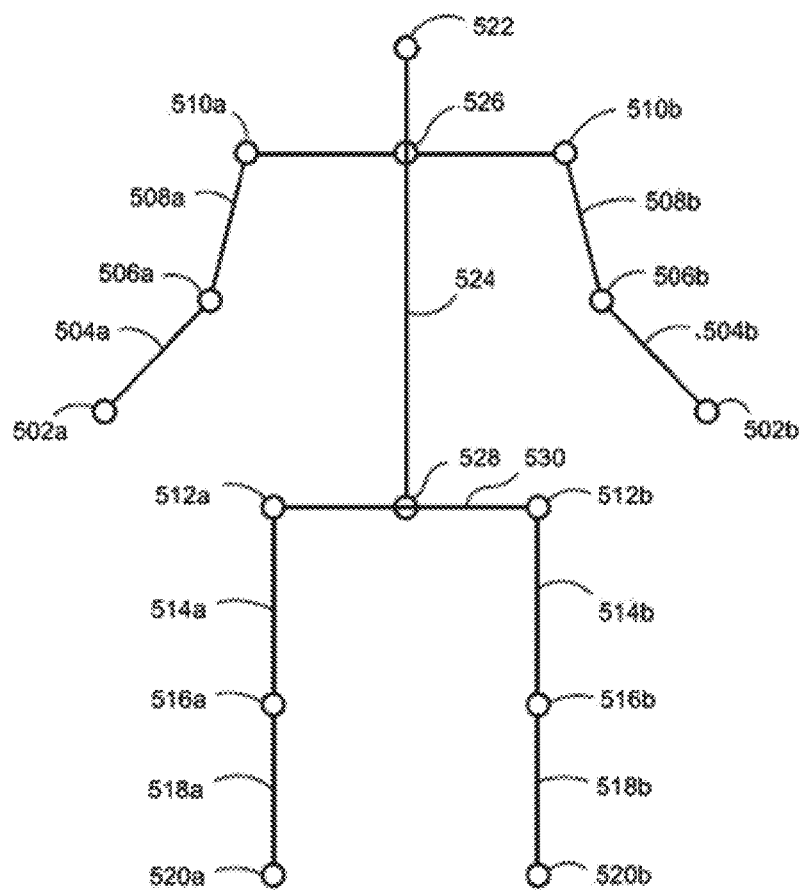
FIG. 5A illustrates a skeletal mapping of a user that has been generated from a target recognition, analysis, and tracking system such as that shown in FIG. 4.

FIG. 5A depicts an example skeletal mapping of a user that may be generated from the capture device 202. In this embodiment, a variety of joints and bones are identified: each hand 502, each forearm 504, each elbow 506, each bicep 508, each shoulder 510, each hip 512, each thigh 514, each knee 516, each foreleg 518, each foot 520, the head 522, the torso 524, the top 526 and bottom 528 of the spine, and the waist 530. Where more points are tracked, additional features may be identified, such as the bones and joints of the fingers or toes, or individual features of the face, such as the nose and eyes.

Through moving his body, a user may create gestures. A gesture comprises a motion or pose by a user that may be captured as image data and parsed for meaning. A gesture may be dynamic, comprising a motion, such as mimicking throwing a ball. A gesture may be a static pose, such as holding one's crossed forearms 504 in front of his torso 524. A gesture may be a single movement (e.g., a jump) or a continuous gesture (e.g., driving), and may be short in duration or long in duration (e.g., driving for 202 minutes). A gesture may also incorporate props, such as by swinging a mock sword. A gesture may comprise more than one body part, such as clapping the hands 502 together, or a subtler motion, such as pursing one's lips.

A user's gestures may be used for input in a general computing context. For instance, various motions of the hands 502 or other body parts may correspond to common system wide tasks such as navigate up or down in a hierarchical list, open a file, close a file, and save a file. For instance, a user may hold his hand with the fingers pointing up and the palm facing the capture device 202. He may then close his fingers towards the palm to make a fist, and this could be a gesture that indicates that the focused window in a window-based user-interface computing environment should be closed. Gestures may also be used in a video-game-specific context, depending on the game. For instance, with a driving game, various motions of the hands 502 and feet 520 may correspond to steering a vehicle in a direction, shifting gears, accelerating, and breaking. Thus, a gesture may indicate a wide variety of motions that map to a displayed user representation, and in a wide variety of applications, such as video games, text editors, word processing, data management, etc.

A user may generate a gesture that corresponds to walking or running, by walking or running in place. For example, the user may alternately lift and drop each leg 512-520 to mimic walking without moving. The system may parse this gesture by analyzing each hip 512 and each thigh 514. A step may be recognized when one hip-thigh angle (as measured relative to a vertical line, wherein a standing leg has a hip-thigh angle of 0°, and a forward horizontally extended leg has a hip-thigh angle of 90°) exceeds a certain threshold relative to the other thigh. A walk or run may be recognized after some number of consecutive steps by alternating legs. The time between the two most recent steps may be thought of as a period. After some number of periods where that threshold angle is not met, the system may determine that the walk or running gesture has ceased.

Given a "walk or run" gesture, an application may set values for parameters associated with this gesture. These parameters may include the above threshold angle, the number of steps required to initiate a walk or run gesture, a number of periods where no step occurs to end the gesture, and a threshold period that determines whether the gesture is a walk or a run. A fast period may correspond to a run, as the user will be moving his legs quickly, and a slower period may correspond to a walk.

A gesture may be associated with a set of default parameters at first that the application may override with its own parameters. In this scenario, an application is not forced to provide parameters, but may instead use a set of default parameters that allow the gesture to be recognized in the absence of application-defined parameters. Information related to the gesture may be stored for purposes of pre-canned gesture animation.

There are a variety of outputs that may be associated with the gesture. There may be a baseline "yes or no" as to whether a gesture is occurring. There also may be a confidence level, which corresponds to the likelihood that the user's tracked movement corresponds to the gesture. This could be a linear scale that ranges over floating point numbers between 0 and 1, inclusive. Wherein an application receiving this gesture information cannot accept false-positives as input, it may use only those recognized gestures that have a high confidence level, such as at least 0.95. Where an application must recognize every instance of the gesture, even at the cost of false-positives, it may use gestures that have at least a much lower confidence level, such as those merely greater than 0.2. The gesture may have an output for the time between the two most recent steps, and where only a first step has been registered, this may be set to a reserved value, such as −1 (since the time between any two steps must be positive). The gesture may also have an output for the highest thigh angle reached during the most recent step.

Another exemplary gesture is a "heel lift jump." In this, a user may create the gesture by raising his heels off the ground, but keeping his toes planted. Alternatively, the user may jump into the air where his feet 520 leave the ground entirely. The system may parse the skeleton for this gesture by analyzing the angle relation of the shoulders 510, hips 512 and knees 516 to see if they are in a position of alignment equal to standing up straight. Then these points and upper 526 and lower 528 spine points may be monitored for any upward acceleration. A sufficient combination of acceleration may trigger a jump gesture. A sufficient combination of acceleration with a particular gesture may satisfy the parameters of a transition point.

Given this "heel lift jump" gesture, an application may set values for parameters associated with this gesture. The parameters may include the above acceleration threshold, which determines how fast some combination of the user's shoulders 510, hips 512 and knees 516 must move upward to trigger the gesture, as well as a maximum angle of alignment between the shoulders 510, hips 512 and knees 516 at which a jump may still be triggered. The outputs may comprise a confidence level, as well as the user's body angle at the time of the jump.

Setting parameters for a gesture based on the particulars of the application that will receive the gesture are important in accurately identifying gestures. Properly identifying gestures and the intent of a user greatly helps in creating a positive user experience.

An application may set values for parameters associated with various transition points to identify the points at which to use pre-canned animations. Transition points may be defined by various parameters, such as the identification of a particular gesture, a velocity, an angle of a target or object, or any combination thereof. If a transition point is defined at least in part by the identification of a particular gesture, then properly identifying gestures assists to increase the confidence level that the parameters of a transition point have been met.

Another parameter to a gesture may be a distance moved. Where a user's gestures control the actions of an avatar in a virtual environment, that avatar may be arm's length from a ball. If the user wishes to interact with the ball and grab it, this may require the user to extend his arm 502-510 to full length while making the grab gesture. In this situation, a similar grab gesture where the user only partially extends his arm 502-510 may not achieve the result of interacting with the ball. Likewise, a parameter of a transition point could be the identification of the grab gesture, where if the user only partially extends his arm 502-510, thereby not achieving the result of interacting with the ball, the user's gesture also will not meet the parameters of the transition point.

A gesture or a portion thereof may have as a parameter a volume of space in which it must occur. This volume of space may typically be expressed in relation to the body where a gesture comprises body movement. For instance, a football throwing gesture for a right-handed user may be recognized only in the volume of space no lower than the right shoulder 510a, and on the same side of the head 522 as the throwing arm 502a-310a. It may not be necessary to define all bounds of a volume, such as with this throwing gesture, where an outer bound away from the body is left undefined, and the volume extends out indefinitely, or to the edge of scene that is being monitored.

Figure 5B:
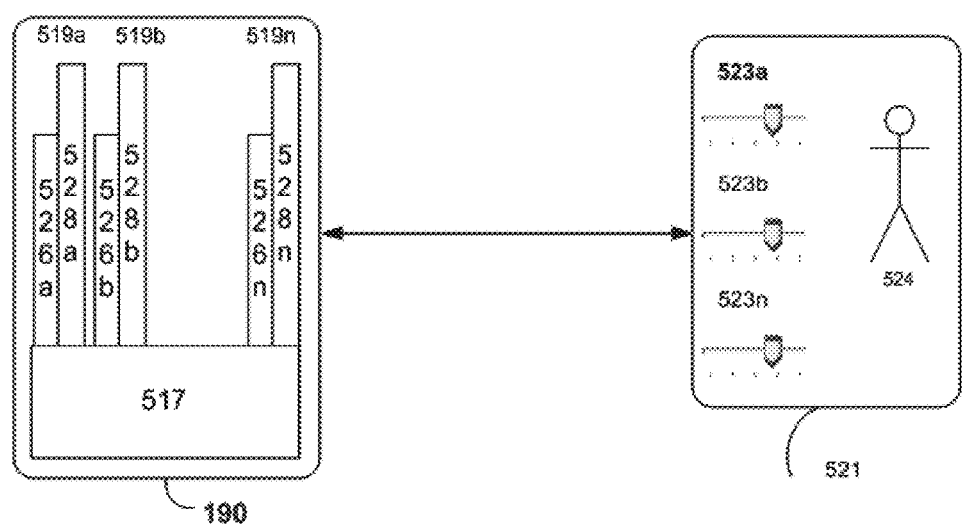
FIG. 5B illustrates further details of a gesture recognizer architecture such as that shown in FIG. 4.

FIG. 5B provides further details of one exemplary embodiment of the gesture recognizer engine 190 of FIG. 2. As shown, the gesture recognizer engine 190 may comprise at least one filter 519 to determine a gesture or gestures. A filter 519 comprises information defining a gesture 526 (hereinafter referred to as a "gesture"), and may comprise at least one parameter 528, or metadata, for that gesture 526. For instance, a throw, which comprises motion of one of the hands from behind the rear of the body to past the front of the body, may be implemented as a gesture 526 comprising information representing the movement of one of the hands of the user from behind the rear of the body to past the front of the body, as that movement would be captured by the depth camera. Parameters 528 may then be set for that gesture 526. Where the gesture 526 is a throw, a parameter 528 may be a threshold velocity that the hand has to reach, a distance the hand must travel (either absolute, or relative to the size of the user as a whole), and a confidence rating by the recognizer engine 190 that the gesture 526 occurred. These parameters 528 for the gesture 526 may vary between applications, between contexts of a single application, or within one context of one application over time.

Filters may be modular or interchangeable. In an embodiment, a filter has a number of inputs, each of those inputs having a type, and a number of outputs, each of those outputs having a type. In this situation, a first filter may be replaced with a second filter that has the same number and types of inputs and outputs as the first filter without altering any other aspect of the recognizer engine 190 architecture. For instance, there may be a first filter for driving that takes as input skeletal data and outputs a confidence that the gesture 526 associated with the filter is occurring and an angle of steering. Where one wishes to substitute this first driving filter with a second driving filter—perhaps because the second driving filter is more efficient and requires fewer processing resources—one may do so by simply replacing the first filter with the second filter so long as the second filter has those same inputs and outputs—one input of skeletal data type, and two outputs of confidence type and angle type.

A filter need not have a parameter 528. For instance, a "user height" filter that returns the user's height may not allow for any parameters that may be tuned. An alternate "user height" filter may have tunable parameters—such as to whether to account for a user's footwear, hairstyle, headwear and posture in determining the user's height.

Inputs to a filter may comprise things such as joint data about a user's joint position, like angles formed by the bones that meet at the joint, RGB color data from the scene, and the rate of change of an aspect of the user. Outputs from a filter may comprise things such as the confidence that a given gesture is being made, the speed at which a gesture motion is made, and a time at which a gesture motion is made.

The gesture recognizer engine 190 may have a base recognizer engine 517 that provides functionality to a gesture filter 519. In an embodiment, the functionality that the recognizer engine 517 implements includes an input-over-time archive that tracks recognized gestures and other input, a Hidden Markov Model implementation (where the modeled system is assumed to be a Markov process—one where a present state encapsulates any past state information necessary to determine a future state, so no other past state information must be maintained for this purpose—with unknown parameters, and hidden parameters are determined from the observable data), as well as other functionality required to solve particular instances of gesture recognition.

Filters 519 are loaded and implemented on top of the base recognizer engine 517 and can utilize services provided by the engine 517 to all filters 519. In an embodiment, the base recognizer engine 517 processes received data to determine whether it meets the requirements of any filter 519. Since these provided services, such as parsing the input, are provided once by the base recognizer engine 517 rather than by each filter 519, such a service need only be processed once in a period of time as opposed to once per filter 519 for that period, so the processing required to determine gestures is reduced.

An application may use the filters 519 provided by the recognizer engine 190, or it may provide its own filter 519, which plugs in to the base recognizer engine 517. Similarly, the gesture profile may plug in to the base recognizer engine 517. In an embodiment, all filters 519 have a common interface to enable this plug-in characteristic. Further, all filters 519 may utilize parameters 528, so a single gesture tool as described below may be used to debug and tune the entire filter system 519.

These parameters 528 may be tuned for an application or a context of an application by a gesture tool 521. In an embodiment, the gesture tool 521 comprises a plurality of sliders 523, each slider 523 corresponding to a parameter 528, as well as a pictorial representation of a body 524. As a parameter 528 is adjusted with a corresponding slider 523, the body 524 may demonstrate both actions that would be recognized as the gesture with those parameters 528 and actions that would not be recognized as the gesture with those parameters 528, identified as such. This visualization of the parameters 528 of gestures provides an effective means to both debug and fine tune a gesture.

The computer executable instructions may comprise instructions for roaming a gesture profile, comprising instructions for identifying the gesture profile associated with a user, wherein the gesture profile comprises personalized gesture information for the user, and wherein the personalized gesture information is derived from data captured by a capture device and representative of a user's position or motion in a physical space; and roaming the gesture profile via a network connection. The instructions may further comprise instructions for receiving a request for the gesture profile, activating the gesture profile based on an identity of the user, and identifying the user from profile data.

The computer executable instructions may also comprise instructions for gesture recognition based on a user's gesture profile, including instructions for activating a gesture profile associated with a user, wherein the gesture profile comprises personalized gesture information for the user, and wherein the personalized gesture information is derived from data captured by a capture device and representative of a user's position or motion in a physical space; and recognizing a user's gesture by comparing the received data to the personalized gesture information in the gesture profile.

FIG. 6 illustrates an example embodiment of a computing environment that may be used to interpret one or more gestures in a target recognition, analysis, and tracking system. The computing environment such as the computing environment 212 described above with respect to FIG. 1 may be a multimedia console 100, such as a gaming console. As shown in FIG. 6, the multimedia console 100 has a central processing unit (CPU) 101 having a level 1 cache 102, a level 2 cache 104, and a flash ROM (Read Only Memory) 106. The level 1 cache 102 and a level 2 cache 104 temporarily store data and hence reduce the number of memory access cycles, thereby improving processing speed and throughput. The CPU 101 may be provided having more than one core, and thus, additional level 1 and level 2 caches 102 and 104. The flash ROM 106 may store executable code that is loaded during an initial phase of a boot process when the multimedia console 100 is powered ON.

A graphics processing unit (GPU) 108 and a video encoder/video codec (coder/decoder) 114 form a video processing pipeline for high speed and high resolution graphics processing. Data is carried from the graphics processing unit 108 to the video encoder/video codec 114 via a bus. The video processing pipeline outputs data to an A/V (audio/video) port 140 for transmission to a television or other display. A memory controller 110 is connected to the GPU 108 to facilitate processor access to various types of memory 112, such as, but not limited to, a RAM (Random Access Memory).

The multimedia console 100 includes an I/O controller 2120, a system management controller 2122, an audio processing unit 2123, a network interface controller 2124, a first USB host controller 2126, a second USB controller 2128 and a front panel I/O subassembly 130 that are preferably implemented on a module 118. The USB controllers 2126 and 2128 serve as hosts for peripheral controllers 142(1)-142(2), a wireless adapter 148, and an external memory device 146 (e.g., flash memory, external CD/DVD ROM drive, removable media, etc.). The network interface 2124 and/or wireless adapter 148 provide access to a network (e.g., the Internet, home network, etc.) and may be any of a wide variety of various wired or wireless adapter components including an Ethernet card, a modem, a Bluetooth module, a cable modem, and the like.

System memory 143 is provided to store application data that is loaded during the boot process. A media drive 144 is provided and may comprise a DVD/CD drive, hard drive, or other removable media drive, etc. The media drive 144 may be internal or external to the multimedia console 100. Application data may be accessed via the media drive 144 for execution, playback, etc. by the multimedia console 100. The media drive 144 is connected to the I/O controller 2120 via a bus, such as a Serial ATA bus or other high speed connection (e.g., IEEE 1394).

The system management controller 2122 provides a variety of service functions related to assuring availability of the multimedia console 100. The audio processing unit 2123 and an audio codec 132 form a corresponding audio processing pipeline with high fidelity and stereo processing. Audio data is carried between the audio processing unit 2123 and the audio codec 132 via a communication link. The audio processing pipeline outputs data to the A/V port 140 for reproduction by an external audio player or device having audio capabilities.

The front panel I/O subassembly 130 supports the functionality of the power button 150 and the eject button lnposelstart152lnposelend, as well as any LEDs (light emitting diodes) or other indicators exposed on the outer surface of the multimedia console 100. A system power supply module 136 provides power to the components of the multimedia console 100. A fan 138 cools the circuitry within the multimedia console 100.

The CPU 101, GPU 108, memory controller 110, and various other components within the multimedia console 100 are interconnected via one or more buses, including serial and parallel buses, a memory bus, a peripheral bus, and a processor or local bus using any of a variety of bus architectures. By way of example, such architectures can include a Peripheral Component Interconnects (PCI) bus, PCI-Express bus, etc.

When the multimedia console 100 is powered ON, application data may be loaded from the system memory 143 into memory 112 and/or caches 102, 104 and executed on the CPU 101. The application may present a graphical user interface that provides a consistent user experience when navigating to different media types available on the multimedia console 100. In operation, applications and/or other media contained within the media drive 144 may be launched or played from the media drive 144 to provide additional functionalities to the multimedia console 100.

The multimedia console 100 may be operated as a standalone system by simply connecting the system to a television or other display. In this standalone mode, the multimedia console 100 allows one or more users to interact with the system, watch movies, or listen to music. However, with the integration of broadband connectivity made available through the network interface 2124 or the wireless adapter 148, the multimedia console 100 may further be operated as a participant in a larger network community.

When the multimedia console 100 is powered ON, a set amount of hardware resources are reserved for system use by the multimedia console operating system. These resources may include a reservation of memory (e.g., 16 MB), CPU and GPU cycles (e.g., 5%), networking bandwidth (e.g., 8 kbs.), etc. Because these resources are reserved at system boot time, the reserved resources do not exist from the application's view.

In particular, the memory reservation preferably is large enough to contain the launch kernel, concurrent system applications and drivers. The CPU reservation is preferably constant such that if the reserved CPU usage is not used by the system applications, an idle thread will consume any unused cycles.

With regard to the GPU reservation, lightweight messages generated by the system applications (e.g., pop-ups) are displayed by using a GPU interrupt to schedule code to render popup into an overlay. The amount of memory required for an overlay depends on the overlay area size and the overlay preferably scales with screen resolution. Where a full user interface is used by the concurrent system application, it is preferable to use a resolution independent of application resolution. A scaler may be used to set this resolution such that the need to change frequency and cause a TV resynch is eliminated.

After the multimedia console 100 boots and system resources are reserved, concurrent system applications execute to provide system functionalities. The system functionalities are encapsulated in a set of system applications that execute within the reserved system resources described above. The operating system kernel identifies threads that are system application threads versus gaming application threads. The system applications are preferably scheduled to run on the CPU 101 at predetermined times and intervals in order to provide a consistent system resource view to the application. The scheduling is to minimize cache disruption for the gaming application running on the console.

When a concurrent system application requires audio, audio processing is scheduled asynchronously to the gaming application due to time sensitivity. A multimedia console application manager (described below) controls the gaming application audio level (e.g., mute, attenuate) when system applications are active.

Input devices (e.g., controllers 142(1) and 142(2)) are shared by gaming applications and system applications. The input devices are not reserved resources, but are to be switched between system applications and the gaming application such that each will have a focus of the device. The application manager preferably controls the switching of input stream, without knowledge the gaming application's knowledge and a driver maintains state information regarding focus switches. The cameras 26, 28 and capture device 202 may define additional input devices for the console 100.

FIG. 7 illustrates another example embodiment of a computing environment 220 that may be the computing environment 212 shown in FIG. 1 used to interpret one or more gestures in a target recognition, analysis, and tracking system. The computing system environment 220 is only one example of a suitable computing environment and is not intended to suggest any limitation as to the scope of use or functionality of the presently disclosed subject matter. Neither should the computing environment 220 be interpreted as having any dependency or requirement relating to any one or combination of components illustrated in the exemplary operating environment 220. In some embodiments the various depicted computing elements may include circuitry configured to instantiate specific aspects of the present disclosure. For example, the term circuitry used in the disclosure can include specialized hardware components configured to perform function(s) by firmware or switches. In other examples embodiments the term circuitry can include a general purpose processing unit, memory, etc., configured by software instructions that embody logic operable to perform function(s). In example embodiments where circuitry includes a combination of hardware and software, an implementer may write source code embodying logic and the source code can be compiled into machine readable code that can be processed by the general purpose processing unit. Since one skilled in the art can appreciate that the state of the art has evolved to a point where there is little difference between hardware, software, or a combination of hardware/software, the selection of hardware versus software to effectuate specific functions is a design choice left to an implementer. More specifically, one of skill in the art can appreciate that a software process can be transformed into an equivalent hardware structure, and a hardware structure can itself be transformed into an equivalent software process. Thus, the selection of a hardware implementation versus a software implementation is one of design choice and left to the implementer.

In FIG. 7, the computing environment 220 comprises a computer 241, which typically includes a variety of computer readable media. Computer readable media can be any available media that can be accessed by computer 241 and includes both volatile and nonvolatile media, removable and non-removable media. The system memory 222 includes computer storage media in the form of volatile and/or nonvolatile memory such as read only memory (ROM) 223 and random access memory (RAM) 261. A basic input/output system 224 (BIOS), containing the basic routines that help to transfer information between elements within computer 241, such as during start-up, is typically stored in ROM 223. RAM 261 typically contains data and/or program modules that are immediately accessible to and/or presently being operated on by processing unit 259. By way of example, and not limitation, FIG. 7 illustrates operating system 225, application programs 226, other program modules 227, and program data 228.

The computer 241 may also include other removable/non-removable, volatile/nonvolatile computer storage media. By way of example only, FIG. 7 illustrates a hard disk drive 238 that reads from or writes to non-removable, nonvolatile magnetic media, a magnetic disk drive 239 that reads from or writes to a removable, nonvolatile magnetic disk 254, and an optical disk drive 240 that reads from or writes to a removable, nonvolatile optical disk 253 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 238 is typically connected to the system bus 221 through an non-removable memory interface such as interface 234, and magnetic disk drive 239 and optical disk drive 240 are typically connected to the system bus 221 by a removable memory interface, such as interface 235.

The drives and their associated computer storage media discussed above and illustrated in FIG. 7, provide storage of computer readable instructions, data structures, program modules and other data for the computer 241. In FIG. 7, for example, hard disk drive 238 is illustrated as storing operating system 258, application programs 257, other program modules 256, and program data 255. Note that these components can either be the same as or different from operating system 225, application programs 226, other program modules 227, and program data 228. Operating system 258, application programs 257, other program modules 256, and program data 255 are given different numbers here to illustrate that, at a minimum, they are different copies. A user may enter commands and information into the computer 241 through input devices such as a keyboard 251 and pointing device 252, commonly referred to as a mouse, trackball or touch pad. Other input devices (not shown) may include a microphone, joystick, game pad, satellite dish, scanner, or the like. These and other input devices are often connected to the processing unit 259 through a user input interface 236 that is coupled to the system bus, but may be connected by other interface and bus structures, such as a parallel port, game port or a universal serial bus (USB). The cameras 26, 28 and capture device 202 may define additional input devices for the console 100. A monitor 242 or other type of display device is also connected to the system bus 221 via an interface, such as a video interface 232. In addition to the monitor, computers may also include other peripheral output devices such as speakers 244 and printer 243, which may be connected through a output peripheral interface 233.

The computer 241 may operate in a networked environment using logical connections to one or more remote computers, such as a remote computer 246. The remote computer 246 may be a personal computer, a server, a router, a network PC, a peer device or other common network node, and typically includes many or all of the elements described above relative to the computer 241, although only a memory storage device 247 has been illustrated in FIG. 7. The logical connections depicted in FIG. 2 include a local area network (LAN) 245 and a wide area network (WAN) 249, but may also include other networks. Such networking environments are commonplace in offices, enterprise-wide computer networks, intranets and the Internet.

When used in a LAN networking environment, the computer 241 is connected to the LAN 245 through a network interface or adapter 237. When used in a WAN networking environment, the computer 241 typically includes a modem 250 or other means for establishing communications over the WAN 249, such as the Internet. The modem 250, which may be internal or external, may be connected to the system bus 221 via the user input interface 236, or other appropriate mechanism. In a networked environment, program modules depicted relative to the computer 241, or portions thereof, may be stored in the remote memory storage device. By way of example, and not limitation, FIG. 7 illustrates remote application programs 248 as residing on memory device 247. It will be appreciated that the network connections shown are exemplary and other means of establishing a communications link between the computers may be used.

It should be understood that the configurations and/or approaches described herein are exemplary in nature, and that these specific embodiments or examples are not to be considered limiting. The specific routines or methods described herein may represent one or more of any number of processing strategies. As such, various acts illustrated may be performed in the sequence illustrated, in other sequences, in parallel, or the like. Likewise, the order of the above-described processes may be changed.

Furthermore, while the present disclosure has been described in connection with the particular aspects, as illustrated in the various figures, it is understood that other similar aspects may be used or modifications and additions may be made to the described aspects for performing the same function of the present disclosure without deviating therefrom. The subject matter of the present disclosure includes all novel and non-obvious combinations and subcombinations of the various processes, systems and configurations, and other features, functions, acts, and/or properties disclosed herein, as well as any and all equivalents thereof. Thus, the methods and apparatus of the disclosed embodiments, or certain aspects or portions thereof, may take the form of program code (i.e., instructions) embodied in tangible media, such as floppy diskettes, CD-ROMs, hard drives, or any other machine-readable storage medium. When the program code is loaded into and executed by a machine, such as a computer, the machine becomes an apparatus configured for practicing the disclosed embodiments.

In addition to the specific implementations explicitly set forth herein, other aspects and implementations will be apparent to those skilled in the art from consideration of the specification disclosed herein. Therefore, the present disclosure should not be limited to any single aspect, but rather construed in breadth and scope in accordance with the appended claims. For example, the various procedures described herein may be implemented with hardware or software, or a combination of both.

What is claimed:

1. A computer-implemented method for associating sets of gesture data to virtual zones in a physical space comprising:
    capturing data from a capture device, wherein the captured data is representative of the physical space and a gesture of a user in the physical space;
    identifying a plurality of virtual zones, wherein each virtual zone of the plurality of virtual zones is representative of a respective portion of the physical space and determined based on a distance to the capture device;
    associating a set of gesture data to each virtual zone of the plurality of virtual zones;
    at a boundary between two virtual zones of the plurality of virtual zones, modifying evaluation of the set of gesture data based on determining a probability that a particular gesture of the set of gesture data was intended for one virtual zone of the two virtual zones;
    comparing the gesture of the user to each set of gesture data associated with a respective virtual zone of the plurality of virtual zones; and
    identifying the gesture of the user based on the comparison of the gesture and the modified evaluation of the set of gesture data.

2. The computer-implemented method of claim 1, wherein the set of gesture data associated with each virtual zone of the plurality of virtual zones is scaled proportionate to a distance of a respective virtual zone of the plurality of virtual zones from the capture device.

3. The computer-implemented method of claim 1, wherein gesture data in a first set of gesture data associated with a first virtual zone of the plurality of virtual zones and gesture data in a second set of gesture data associated with a second virtual zone of the plurality of virtual zones both correspond to a control in a gesture-based system.

4. The computer-implemented method of claim 1, wherein the user can change preferences for the set of gesture data associated with the virtual zone of the plurality of virtual zones.

5. The computer-implemented method of claim 1, wherein the portion of the physical space represented by a virtual zone of the plurality of virtual zones is determined based on a type of input applicable for the portion of the physical space, the type of input being at least one of a touch-screen input, a finger-scale input, a body-scale input, a small motion input, or a large motion input.

6. The computer-implemented method of claim 1, wherein the captured data is further representative of a user.

7. The computer-implemented method of claim 6, further comprising:
    identifying a position of the user in the physical space, from the captured data, relative to a virtual zone of the plurality of virtual zones.

8. A computing system comprising:
    one or more processors;
    one or more memories having stored therein computer-executable instructions that, upon execution by the one or more processors, cause the computing system to perform operations comprising:
        capturing data from a capture device, wherein the captured data is representative of a physical space and a gesture of a user in the physical space;
        identifying a plurality of virtual zones, wherein each virtual zone of the plurality of virtual zones is representative of a respective portion of the physical space;
        associating a set of gesture data to each virtual zone of the plurality of virtual zones based on a distance of each virtual zone of the plurality of virtual zones from the capture device;
        at a boundary between two virtual zones of the plurality of virtual zones, modifying evaluation of the set of gesture data based on determining a probability that the user intended to perform a particular gesture of the set of gesture data in one virtual zone of the two virtual zones;
        comparing the gesture of the user to each set of gesture data associated with a respective virtual zone of the plurality of virtual zones; and
        identifying the gesture of the user based on the comparison of the gesture and the modified evaluation of the set of gesture data.

9. The computing system of claim 8, wherein the set of gesture data associated with each virtual zone of the plurality of virtual zones is scaled proportionate to a distance of a respective virtual zone of the plurality of virtual zones from the capture device.

10. The computing system of claim 8, wherein gesture data in a first set of gesture data associated with a first virtual zone of the plurality of virtual zones and gesture data in a second set of gesture data associated with a second virtual zone of the plurality of virtual zones both correspond to a control in a gesture-based system.

11. The computing system of claim 8, wherein the user can change preferences for the set of gesture data associated with the virtual zone of the plurality of virtual zones.

12. The computing system of claim 8, wherein the portion of the physical space represented by a virtual zone of the plurality of virtual zones is determined based on a type of input applicable for the portion of the physical space, the type of input being at least one of a touch-screen input, a finger-scale input, a body-scale input, a small motion input, or a large motion input.

13. The computing system of claim 8, wherein the captured data is further representative of a user.

14. The computing system of claim 13, wherein the operations further comprise:
identifying a position of the user in the physical space, from the captured data, relative to a virtual zone of the plurality of virtual zones.

15. One or more computer-readable storage memories, which are components of a system, having stored thereon computer-executable instructions, upon execution by one or more processors, cause the system to perform operations comprising:
capturing data from a capture device, wherein the captured data is representative of a physical space and a gesture of a user in the physical space;
identifying a plurality of virtual zones, wherein each virtual zone of the plurality of virtual zones is representative of a respective portion of the physical space based on a distance from a predefined reference point;
associating a set of gesture data to each virtual zone of the plurality of virtual zones;
at a boundary between two virtual zones of the plurality of virtual zones, modifying evaluation of the set of gesture data based on determining a probability a particular gesture of the set of gesture data is associated with one virtual zone of the two virtual zones;
comparing the gesture of the user to each set of gesture data associated with a respective virtual zone of the plurality of virtual zones; and
identifying the gesture of the user based on the comparison of the gesture and the modified evaluation of the set of gesture data.

16. The one or more computer-readable storage memories of claim 15, wherein the set of gesture data associated with each virtual zone of the plurality of virtual zones is scaled proportionate to a distance of the respective virtual zone from the capture device.

17. The one or more computer-readable storage memories of claim 15, wherein gesture data in a first set of gesture data associated with a first virtual zone of the plurality of virtual zones and gesture data in a second set of gesture data associated with a second virtual zone of the plurality of virtual zones both correspond to a control in a gesture-based system.

18. The one or more computer-readable storage memories of claim 15, wherein the user can change preferences for the set of gesture data associated with the virtual zone of the plurality of virtual zones.

19. The one or more computer-readable storage memories of claim 15, wherein the portion of the physical space represented by a virtual zone of the plurality of virtual zones is determined based on a type of input applicable for the portion of the physical space, the type of input being at least one of a touch-screen input, a finger-scale input, a body-scale input, a small motion input, or a large motion input.

20. The one or more computer-readable storage memories of claim 19, wherein the captured data is further representative of a user, and wherein the operations further comprise:
identifying a position of the user in the physical space, from the captured data, relative to a virtual zone of the plurality of virtual zones.

* * * * *